(12) United States Patent
Gunnarsson et al.

(10) Patent No.: US 11,240,776 B2
(45) Date of Patent: Feb. 1, 2022

(54) NETWORK NODE, WIRELESS DEVICE AND METHODS PERFORMED THEREIN FOR MANAGING POSITIONING OF THE WIRELESS DEVICE

(71) Applicant: Telefonaktiebolaget LM Ericsson (publ), Stockholm (SE)

(72) Inventors: Fredrik Gunnarsson, Linköping (SE); Henrik Rydén, Solna (SE); Sara Modarres Razavi, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/483,085

(22) PCT Filed: Jan. 26, 2018

(86) PCT No.: PCT/SE2018/050060
§ 371 (c)(1),
(2) Date: Aug. 2, 2019

(87) PCT Pub. No.: WO2018/143870
PCT Pub. Date: Aug. 9, 2018

(65) Prior Publication Data
US 2020/0236644 A1    Jul. 23, 2020

Related U.S. Application Data

(60) Provisional application No. 62/454,086, filed on Feb. 3, 2017.

(51) Int. Cl.
*H04W 64/00* (2009.01)
*G01S 5/02* (2010.01)

(52) U.S. Cl.
CPC .......... *H04W 64/00* (2013.01); *G01S 5/0236* (2013.01)

(58) Field of Classification Search
CPC ... H04W 64/00; H04W 24/10; H04W 64/003; H04W 4/02; H04W 88/02; H04W 64/006;
(Continued)

(56) References Cited

U.S. PATENT DOCUMENTS

| | | | |
|---|---|---|---|
| 2015/0215729 A1* | 7/2015 | Opshaug | G01S 5/0215 455/456.1 |
| 2017/0374638 A1* | 12/2017 | Han | G01S 5/10 |
| 2018/0217224 A1* | 8/2018 | Jain | G01S 5/0263 |

FOREIGN PATENT DOCUMENTS

WO    2016122761 A1    4/2016

OTHER PUBLICATIONS

Author Unknown, "Technical Specification Group Core Network and Terminals; Locations Services (LCS); LCS Application Protocol (LCS-AP) between the Mobile Management Entity (MME) and Evolved Serving Mobile Location Centre (E-SMLC); SLs interface (Release 14)," Technical Specification 29.171, Version 14.0.0, 3GPP Organizational Partners, Dec. 2016, 54 pages.

(Continued)

*Primary Examiner* — Kwasi Karikari
(74) *Attorney, Agent, or Firm* — Christopher & Weisberg, P.A.

(57) ABSTRACT

Embodiments herein disclose a method performed by a wireless device for managing positioning of the wireless device in the wireless communications network. The wireless device obtains, from a network node, assistance data or configuration data comprising two or more positioning reference signal, PRS, configurations associated with a radio network node or a service area of the radio network node. The wireless device further indicates, to the network node, a scope of usage of the two or more PRS configurations with an indication.

5 Claims, 15 Drawing Sheets

(58) Field of Classification Search
CPC . H04W 72/0446; H04W 16/28; H04W 48/12; H04W 40/244
See application file for complete search history.

(56) References Cited

OTHER PUBLICATIONS

Author Unknown, "Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 13)," Technical Specification 29.172, Version 13.1.0, 3GPP Organizational Partners, Jun. 2016, 40 pages.

Author Unknown, "Technical Specification Group Radio Access Network; Evolved Universal Terrestrial Radio Access (E-UTRA); User Equipment (UE) radio transmission and reception (Release 14)," Technical Specification 36.101, Version 14.2.1, 3GPP Organizational Partners, Jan. 2017, 1262 pages.

Author Unknown, "Technical Specification Group Radio Access Network; Evolved Universal Terrestrial Radio Access (E-UTRA); Physical channels and modulation (Release 14)," Technical Specification 36.211, Version 14.1.0, 3GPP Organizational Partners, Dec. 2016, 175 pages.

Author Unknown, "Technical Specification Group Radio Access Network; Evolved Universal Terrestrial Radio Access (E-UTRA); Physical layer procedures (Release 14)," Technical Specification 36.213, Version 14.1.0, 3GPP Organizational Partners, Dec. 2016, 414 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.1.0, 3GPP Organizational Partners, Dec. 2016, 654 pages.

Author Unknown, "Technical Specification Group Radio Access Network; Evolved Universal Terrestrial Radio Access (E-UTRA); LTE Positioning Protocol (LPP) (Release 14)," Technical Specification 36.355, Version 14.0.0, 3GPP Organizational Partners, Dec. 2016, 151 pages.

Author Unknown, "Technical Specification Group Radio Access Network; Evolved Universal Terrestrial Radio Access (E-UTRA); LTE Positioning Protocol A (LPPa) (Release 14)," Technical Specification 36.455, Version 14.0.0, 3GPP Organizational Partners, Jan. 2017, 67 pages.

Ericsson, et al., "R1-1613541: WF on OTDOA enhancements for FeMTC," Third Generation Partnership Project (3GPP), TSG RAN WG1 Meeting #87, Nov. 14-18, 2016, 6 pages, Reno, Nevada, USA.

Ericsson, "R3-162962: OTDOA Enhancements for Same-PCI Issue and Multiple TPs," Change Request TS 36.455, Third Generation Partnership Project (3GPP), TSG-RAN WG3 Meeting #94, Nov. 14-18, 2016, 14 pages, Reno, NV, USA.

International Search Report and Written Opinion for International Patent Application No. PCT/SE2018/050060, dated Mar. 29, 2018, 12 pages.

Written Opinion for International Patent Application No. PCT/SE2018/050060, dated Jan. 4, 2019, 3 pages.

International Preliminary Report on Patentability for International Patent Application No. PCT/SE2018/050060, dated Apr. 9, 2019, 4 pages.

Examination Report for European Patent Application No. 18703652, dated Dec. 17, 2019, 5 pages.

Examination Report for European Patent Application No. 18703652, dated Jul. 3, 2020, 6 pages.

\* cited by examiner

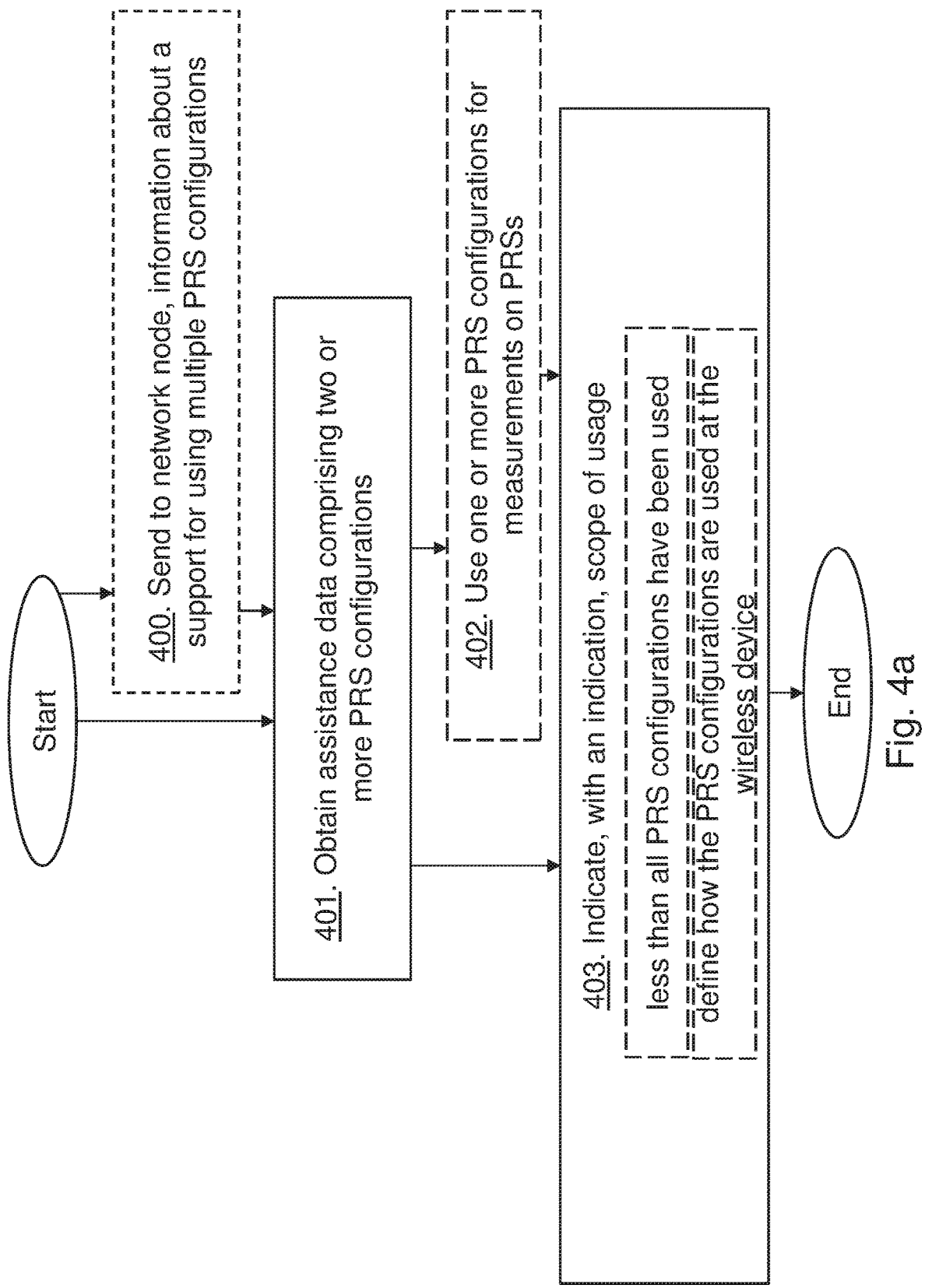

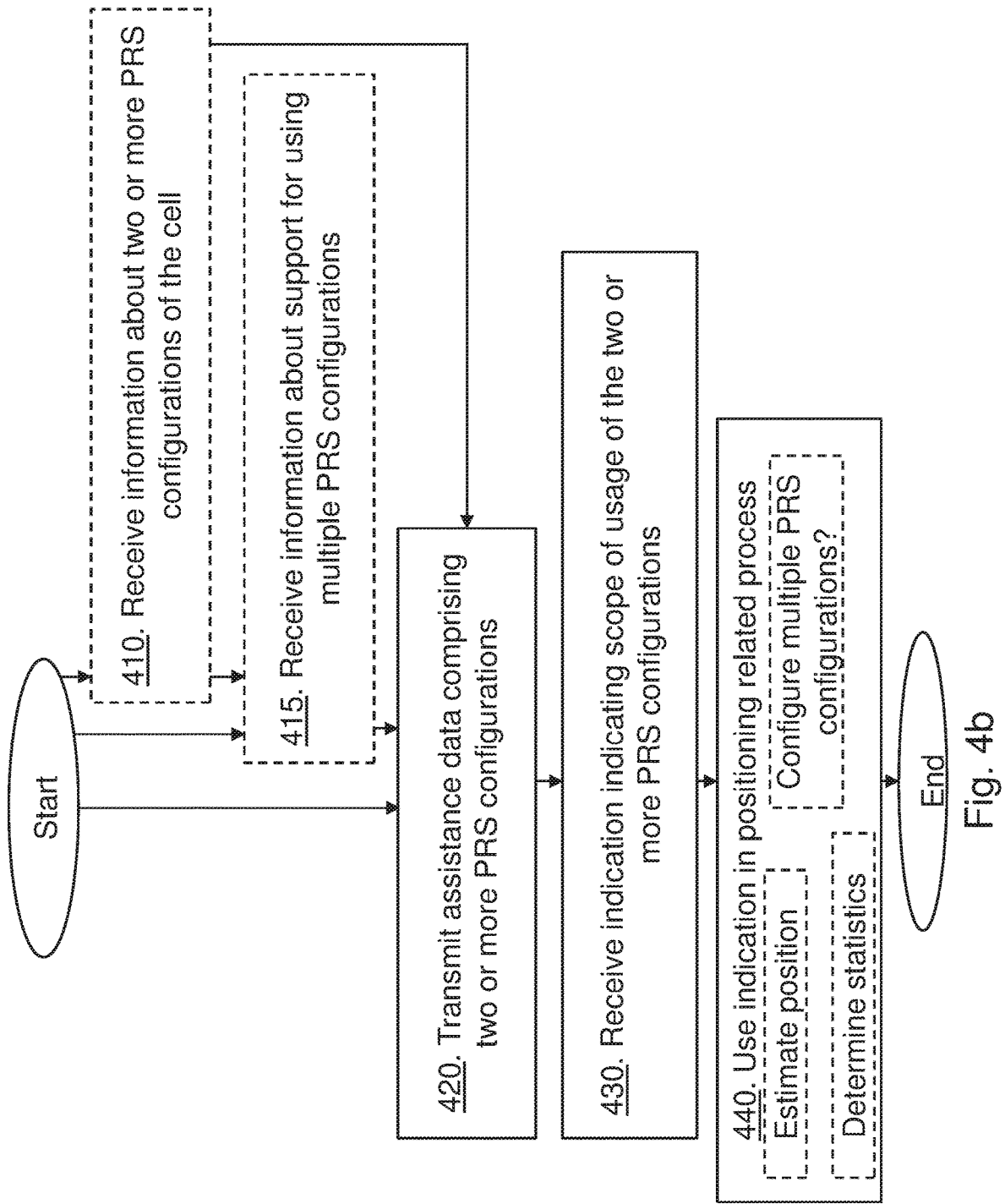

```
-- ASN1START

OTDOA-ProvideCapabilities ::= SEQUENCE {
    otdoa-Mode       BIT STRING { ue-assisted (0) } (SIZE (1..8)),
    ...,
    supportedBandListEUTRA         SEQUENCE (SIZE (1..maxBands)) OF SupportedBandEUTRA          OPTIONAL,
    supportedBandListEUTRA-v9a0    SEQUENCE (SIZE (1..maxBands)) OF SupportedBandEUTRA-v9a0
                                                                                                OPTIONAL,
    interFreqRSTDmeasurement-r10         ENUMERATED { supported }                               OPTIONAL,
    additionalNeighbourCellInfoList-r10  ENUMERATED { supported }                               OPTIONAL,
    prs-id-r14                           ENUMERATED { supported }                               OPTIONAL,
    tp-separation-via-muting-r14         ENUMERATED { supported }                               OPTIONAL,
    additional-prs-config-r14            ENUMERATED { supported }                               OPTIONAL,
    prs-based-tbs-r14                    ENUMERATED { supported }                               OPTIONAL,
    additionalPathsReport-r14            ENUMERATED { supported }                               OPTIONAL,
    cePrsConfig-r14                      ENUMERATED { supported }                               OPTIONAL,
    supportedNoCePrsConfigs-r14          INTEGER (1..3)
    supportedPrsBandwidth-r14            ENUMERATED { n6, n15, n25, n50, n75, n100, ... }       OPTIONAL,
    cePrsFrequencyHopping-r14            ENUMERATED { supported }
} maxBands INTEGER ::= 64

SupportedBandEUTRA ::= SEQUENCE {
    bandEUTRA       INTEGER (1..maxFBI)
}

SupportedBandEUTRA-v9a0 ::= SEQUENCE {
    bandEUTRA-v9a0    INTEGER (maxFBI-Plus1..maxFBI2)                                           OPTIONAL
} maxFBI         INTEGER ::= 64  -- Maximum value of frequency band indicator
maxFBI-Plus1   INTEGER ::= 65  -- lowest value extended FBI range
maxFBI2        INTEGER ::= 256 -- highest value extended FBI range

-- ASN1STOP
```

Fig. 6

```
-- ASN1START cePrS-Info-r14 ::= SEQUENCE {
    cePrs-ConfigurationIndex-r14 INTEGER (0..4095),
    cePrs-MutingInfo-r14       CHOICE {
        po2-r9                 BIT STRING (SIZE(2)),
        po4-r9                 BIT STRING (SIZE(4)),
        po8-r9                 BIT STRING (SIZE(8)),
        po16-r9                BIT STRING (SIZE(16)),
        ...
    }                                                 OPTIONAL,    -- Cond NotSameAsPRS0
    cePrsID-r14                INTEGER (0..4095)      OPTIONAL,    -- Need ON
    cePrsConfigList-r14        CePrsConfigList-r14,
    ...
}

CePrsConfigList-r14 ::= SEQUENCE (SIZE (1..3)) OF CePrsConfig-r14

CePrsConfig-r14 ::= SEQUENCE {
    cePrsConfigID-r14          INTEGER (1..3),
    cePrs-Bandwidth-r14        ENUMERATED { n6, n15, n25, n50, n75, n100, ... },
    ceNumDL-Frames-r14         ENUMERATED {sf-1, sf-2, sf-4, sf-6, sf-10, sf-20, sf-40, sf-80, sf-160, ... },
    cePrsPeriod-r14            ENUMERATED {sf-10, sf-20, sf-40, sf-80, ... }
                                                                   -- Cond CE-PRS
    cePrsFhConfig-r14          ENUMERATED {nb-2, nb-4, ...} OPTIONAL,                      -- Cond CE-FH
    cePrsFhNarrowbandsList-r14 CePrsFhNarrowbandsList-r14                                  -- Cond CE-FH
}

CePrsFhNarrowbandsList-r14 ::= SEQUENCE (SIZE(1..3)) OF CePrsFhNarrowband-r14

CePrsFhNarrowband-r14 ::= SEQUENCE {
    cePrsFhNarrowband-r14 INTEGER (1..maxAvailCeNarrowBands-r14)
} maxAvailNarrowBands-r14    INTEGER ::= 16  -- Maximum number of narrowbands

-- ASN1STOP
```

Fig. 7

```
-- ASN1START

OTDOA-SignalMeasurementInformation ::= SEQUENCE {
    systemFrameNumber      BIT STRING (SIZE (10)),
    physCellIdRef          INTEGER (0..503),
    cellGlobalIdRef        ECGI                          OPTIONAL,
    earfcnRef              ARFCN-ValueEUTRA              OPTIONAL,    -- Cond NotSameAsRef0
    referenceQuality       OTDOA-MeasQuality             OPTIONAL,
    neighbourMeasurementList  NeighbourMeasurementList,
    ...,
    [[ earfcnRef-v9a0      ARFCN-ValueEUTRA-v9a0 OPTIONAL             -- Cond
NotSameAsRef1
    ]],
    [[ tpIdRef-r14         INTEGER (0..4095)     OPTIONAL,            -- Cond
ProvidedByServer0
       prsIdRef-r14        INTEGER (0..4095)     OPTIONAL,            -- Cond
ProvidedByServer1
       additionalPathsRef-r14  AdditionalPathList-r14 OPTIONAL
    ]],
    [[ earfcnRef-v9a0      ARFCN-ValueEUTRA-v9a0 OPTIONAL              -- Cond
NotSameAsRef1
    ]]
    [[ usedPrsConfigListRef-r14
       UsedPrsConfigList-r14 OPTIONAL            -- Cond ProvidedByServer2
    ]]
}

NeighbourMeasurementList ::= SEQUENCE (SIZE(1..24)) OF NeighbourMeasurementElement
```

Fig. 8a

```
NeighbourMeasurementElement ::= SEQUENCE {
    physCellIdNeighbour       INTEGER (0..503),
    cellGlobalIdNeighbour ECGI                    OPTIONAL,
    earfcnNeighbour       ARFCN-ValueEUTRA        OPTIONAL,
    rstd              INTEGER (0..12711),
    rstd-Quality      OTDOA-MeasQuality,
    ...,
    [[ earfcnNeighbour-v9a0 ARFCN-ValueEUTRA-v9a0 OPTIONAL     -- Cond NotSameAsRef2
    ]],
    [[ tpIdNeighbour-r14  INTEGER (0..4095)       OPTIONAL,    -- Cond NotSameAsRef3
       prsIdNeighbour-r14 INTEGER (0..4095)       OPTIONAL,    -- Cond ProvidedByServer0
       delta-rstd-r14     INTEGER (0..5)          OPTIONAL,    -- Cond ProvidedByServer1
       additionalPathsNeighbour-r14
                        AdditionalPathList-r14    OPTIONAL
    ]],
    [[ usedPrsConfigListNeighbor-r14
                     UsedPrsConfigList-r14 OPTIONAL       -- Cond ProvidedByServer2
    ]]
}

AdditionalPathList-r14 ::= SEQUENCE (SIZE(1..maxPaths-r14)) OF AdditionalPath-r14 maxPaths-r14   INTEGER ::= 2

UsedPrsConfigList-r14 ::= SEQUENCE (SIZE(1..5)) OF UsedPrsConfig-r14

UsedPrsConfig -r14 ::= SEQUENCE {
    usedPrsConfig -r14  ENUMERATED {prs, cePrs1, cePrs2, cePrs3, nbPrs}
}

-- ASN1STOP
```

Fig. 8b

```
-- ASN1START

OTDOA-TargetDeviceErrorCauses ::= SEQUENCE {
    cause   ENUMERATED {undefined,
                        assistance-data-missing,
                        unableToMeasureReferenceCell,
                        unableToMeasureAnyNeighbourCell,
                        unableToMeasureSomeNeighbourCells,
                        attemptedButUnableToMeasureSomeNeighbourCells,
                        unableToMeasureSomePrsConfigurations,
                        ...
                        },
    ...
}

-- ASN1STOP
```

Fig. 9

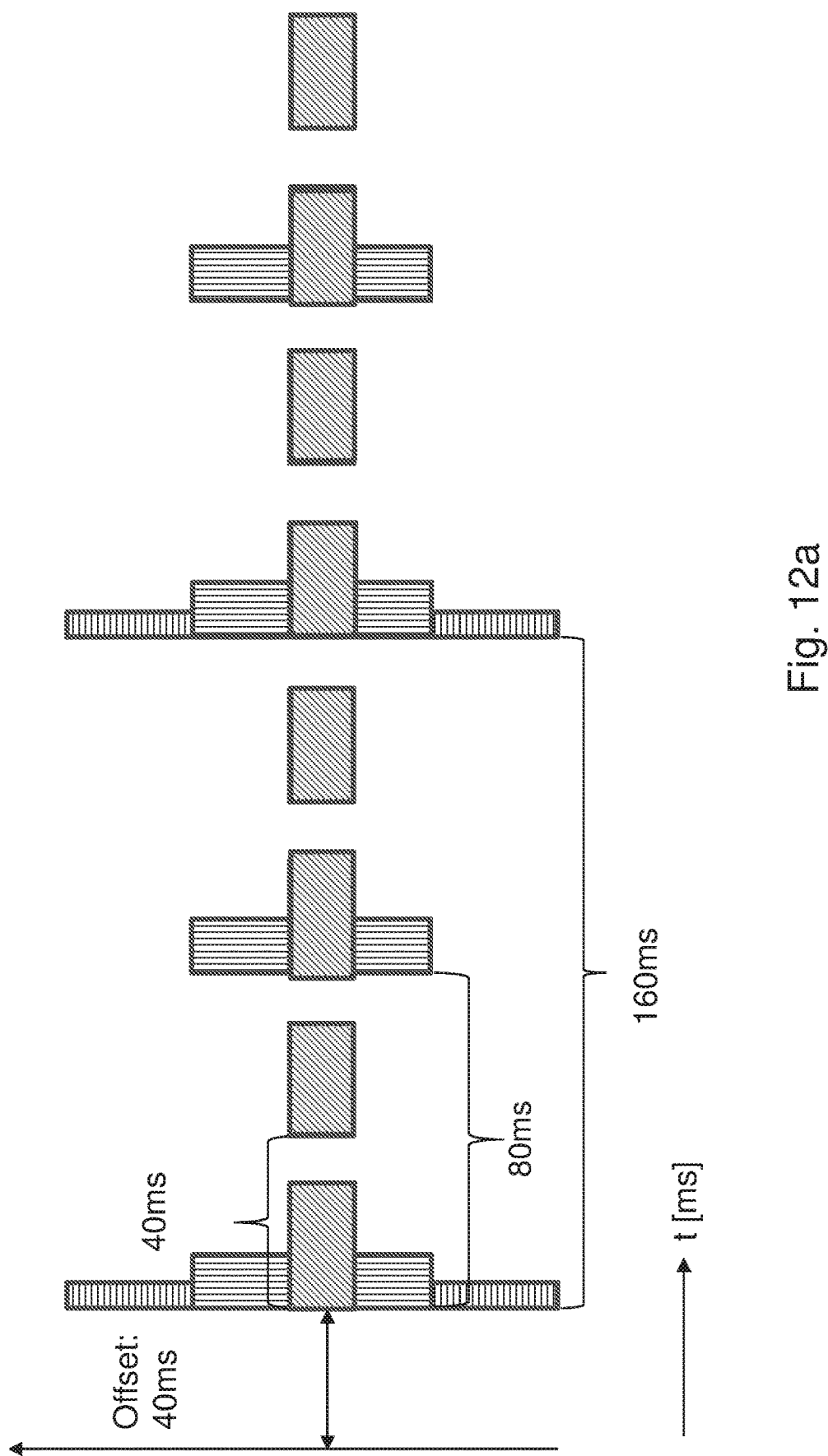

NETWORK NODE, WIRELESS DEVICE AND METHODS PERFORMED THEREIN FOR MANAGING POSITIONING OF THE WIRELESS DEVICE

This application is a 35 U.S.C. § 371 national phase filing of International Application No. PCT/SE2018/050060, filed Jan. 26, 2018, which claims the benefit of U.S. Provisional Application No. 62/454,086, filed Feb. 3, 2017, the disclosures of which are incorporated herein by reference in their entireties.

TECHNICAL FIELD

Embodiments herein relate to a network node, a wireless device and methods performed therein. In particular, embodiments herein relate to managing positioning of the wireless device in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas also referred to as cells, or cell areas, which may also be referred to as a beam or a beam group, with each service area or beam group being served or controlled by a radio network node such as a radio access node e.g., a Wi-Fi access point or a radio base station (RBS), which in some networks may also be denoted, for example, a gNodeB, a NodeB or eNodeB. The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The Internet of Things (IoT) is a vision for the future world where everything that can benefit from a connection will be connected. Cellular technologies are being developed or evolved to play an indispensable role in the IoT world, particularly e.g. machine type communications (MTC). MTC is characterized by lower demands on data rates than for example mobile broadband, but with higher requirements on e.g. low cost device design, better coverage, and ability to operate for years on batteries without having to charge or replace the batteries. To meet IoT design objectives, 3GPP has standardized Narrowband IoT (NB-IoT) in Release 13 that has a system bandwidth of 180 kHz and targets improved coverage, long battery life, low complexity communication design, and with a network capacity that is sufficient for supporting a massive number of devices.

To further increase the market impact of further enhanced MTC (FeMTC) and NB-IoT, improving narrowband support for positioning wireless devices has been agreed to be a key aspect of both of these types of devices in Release 14. The enhancement will be designed to maintain an ultra-low cost and complexity of these wireless devices where appropriate, as well as the coverage and capacity of the network.

Besides NB-IoT, LTE Release 13 also introduced a wireless device category M1 which addresses wireless devices with somewhat more demanding MTC applications. Wireless device category M1 is associated with a maximum channel bandwidth of 6 Physical Resource Blocks (PRB), corresponding to 1.08 MHz excluding guard bands or 1.4 MHz including guard bands, which can be compared to 1 PRB for NB-IoT wireless devices or 100 PRBs for LTE wireless device of higher categories. Furthermore, 3GPP has initiated an LTE Release 14 work item on "Further enhanced MTC" (FeMTC) where a wireless device type based on wireless device category M1 with a maximum channel bandwidth of approximately 25 PRBs, corresponding to 4.5 MHz excluding guard bands and 5 MHz including guard bands, will be specified in order to address even more demanding applications. In this work item, Observed Time Difference of Arrival (OTDOA) improvements with respect to positioning accuracy, wireless device complexity and power consumption for these wireless devices such as 6-PRB and 25-PRB wireless devices, are also being considered for standardization.

Both NB-IoT and FeMTC are candidates to provide IoT services in an unlicensed spectrum. In this case the technologies need to be adapted to cater for operation in accordance with national or regional regulations. Such regulations may e.g. limit the downlink transmission time and capacity through the introduction of duty cycle requirements. In Europe, the European Telecommunications Standards Institute (ETSI) is e.g. mandating a 10% duty cycle for all transmitters operating in unlicensed sub-GHz frequency bands.

Location-based services and emergency call positioning drive the development of positioning in wireless communication networks. Positioning support in Third Generation Partnership Project Long Term Evolution (3GPP LTE) was introduced in Release 9. This enables operators to retrieve positioning information for location-based services and to meet regulatory emergency call positioning requirements.

Positioning in LTE is supported by the architecture shown in FIG. 1, with direct interactions between a wireless device and a location server, also referred to as a location node, e.g. an Evolved Serving Mobile Location Center (E-SMLC) using an LTE Positioning Protocol (LPP). Moreover, there are also interactions between the location node and a radio network node such as an eNodeB (eNB) via LPP annex (LPPa) protocol, and to some extent also interactions between the eNB and the wireless device via the Radio Resource Control (RRC) protocol. Positioning requests may come from a wireless device, a Mobility Management Entity (MME) or a Gateway Mobile Location Centre (GMLC).

The following positioning techniques are considered in LTE:

Enhanced Cell ID (E-CID). Essentially cell ID information to associate the wireless device to the serving area of a serving cell, and then additional information to determine a finer granularity position.

Assisted Global Navigation Satellite Systems (GNSS). GNSS information retrieved by the wireless device, supported by assistance information provided to the wireless device from the E-SMLC.

OTDOA. The wireless device estimates the time difference of reference signals, such as positioning reference signals (PRS), from different base stations and sends to the E-SMLC for multilateration.

Uplink Time Difference of Arrival (UTDOA). The wireless device is requested to transmit a specific waveform that is detected by multiple location measurement units (e.g. an eNB) at known positions. These measurements are forwarded to the E-SMLC for multilateration. Multilateration is a surveillance technique based on the measurement of the difference in distance to two stations at known locations by broadcasting signals at known times.

OTDOA has been introduced in 3GPP release 9 as a downlink (DL) positioning method. As illustrated in FIG. 2, OTDOA in LTE is based on the wireless device measuring the time of arrival (TOA) of signals received from e.g. three radio network nodes. The wireless device measures the relative difference between a reference cell and another specific cell, which relative difference measurement is denoted as reference signal time difference (RSTD) measurement. Every such RSTD determines a hyperbola and the interception point of these hyperbolas may be considered as the position of the wireless device. Here, the reference cell is selected by the wireless device and the RSTD measurement can be performed on intra-frequency cells, i.e. reference cells/neighbor cells that are on the same carrier frequency as the serving cell, or an inter-frequency cell, i.e. at least one of reference cell/neighbor cell is on a different carrier frequency from the serving cell. The positioning may be estimated at the location node, which may also provide, to the wireless device, assistance data for positioning the wireless device.

OTDOA may be a supported method for wireless devices for further enhancements for enhanced machine type communication (FeMTC) also referred to as Coverage Enhancement (CE) devices, and also for wireless devices of Narrowband Internet on Things (NB-IoT).

SUMMARY

Wireless devices may possibly support multiple Positioning Reference Signal (PRS) configurations per cell. When configuring wireless devices with two or more PRS configurations, a network node, such as an e-SMLC, can enable more advanced processing of PRS signals by the wireless devices. An object herein is to provide a mechanism that manages positioning of a wireless device in a wireless communications network in an efficient manner.

According to an aspect the object is achieved by providing a method performed by a wireless device for managing positioning of the wireless device in a wireless communications network. The wireless device obtains, from a network node such as a location node or a radio network node, assistance data comprising two or more PRS configurations associated with a radio network node or a service area of the radio network node. The wireless device may then use the obtained configuration for measurements, e.g. PRS measurements. The wireless device indicates, to the network node, a scope of usage of the two or more PRS configurations with an indication. For example, the wireless device may indicate that less than all PRS configurations have been used, and/or how the PRS configurations are used at the wireless device.

According to another aspect the object is achieved by providing a method performed by a network node, such as a location node or a radio network node, for handling positioning of a wireless device in a wireless communications network. The network node transmits assistance data comprising two of more PRS configurations associated with a radio network node or with a service area of the radio network node. The network node further receives, from the wireless device, an indication indicating a scope of usage of the two of more PRS configurations. The network node uses the indication in a positioning related process e.g. the network node may estimate (accuracy of) a position of the wireless device based on the received indication or may be used to decide whether to configure multiple PRS configurations in one or more regions.

It is furthermore provided herein a computer program comprising instructions, which, when executed on at least one processor, cause the at least one processor to carry out any of the methods above, as performed by the wireless device or network node. It is additionally provided herein a computer-readable storage medium, having stored thereon a computer program comprising instructions which, when executed on at least one processor, cause the at least one processor to carry out the method according to any of the methods above, as performed by the wireless device or network node.

According to yet another aspect the object is achieved by providing a wireless device for managing positioning of the wireless device in a wireless communications network. The wireless device is configured to obtain from a network node, such as a location node, assistance data comprising two or more PRS configurations associated with a radio network node or a service area of the radio network node. The wireless device is further configured to indicate to the network node, a scope of usage of the two or more PRS configurations with an indication.

According to still another aspect the object is achieved by providing a network node, such as a location node, for handling positioning of a wireless device in a wireless communications network. The network node is configured to transmit, to the wireless device, assistance data comprising two of more PRS configurations associated with a radio network node or with a service area of the radio network node. The network node is further configured to receive from the wireless device, an indication indicating a scope of usage of the two of more PRS configurations; and to use the indication in a positioning related process.

According to embodiments the network node is made aware of how the wireless device exploits multiple PRS configurations by signalling, from the wireless device, the indication indicating the scope of usage of used PRS configurations to the network node. This enables, at the network node, e.g. relevant assessment of the reported positioning information taking the the indication into account and thus enables an efficient managing of positioning of the wireless device.

BRIEF DESCRIPTION OF THE DRAWINGS

Embodiments will now be described in more detail in relation to the enclosed drawings, in which:

FIG. 4a is a flowchart depicting a method performed by a wireless device according to embodiments herein;

FIG. 4b is a flowchart depicting a method performed by a network node such as a location node according to embodiments herein;

FIG. 6 shows an example of an OTDOA target device capability, indicating support for multiple PRS configurations;

FIG. 7 shows an example of PRS configurations, where each PRS configuration is associated with an identifier;

FIGS. 8a-8b show an example of signal measurement information, where a list of identifiers associated to used PRS configurations identifiers can be included;

FIG. 9 shows an example of an OTDOA target device error cause for the use of an indication that it was not possible to measure all PRS configurations

FIG. 12a is a schematic overview depicting a first PRS configuration; and

DETAILED DESCRIPTION

Figure 1:
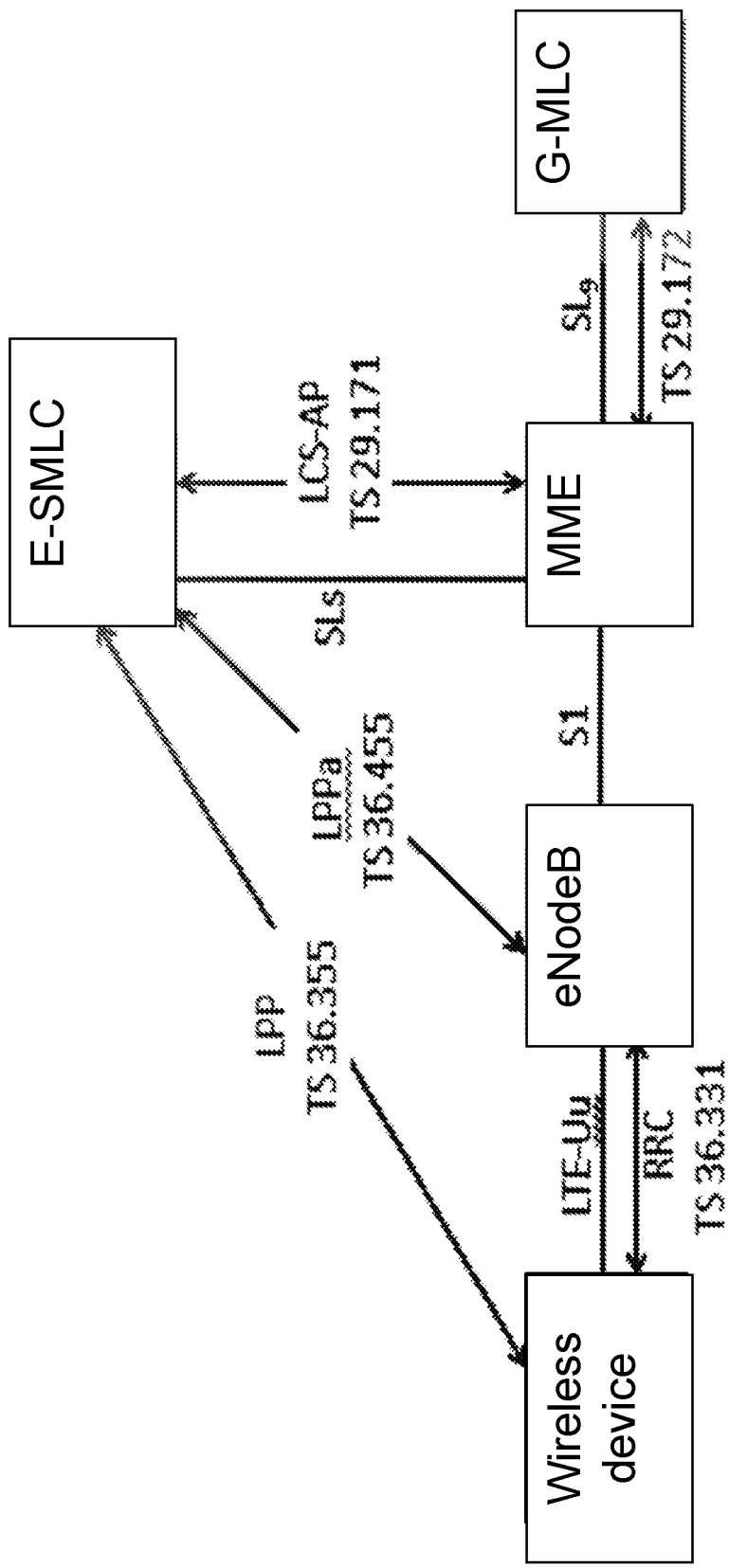
FIG. 1 is a schematic overview depicting an LTE positioning architecture according to prior art.
Figure 2:
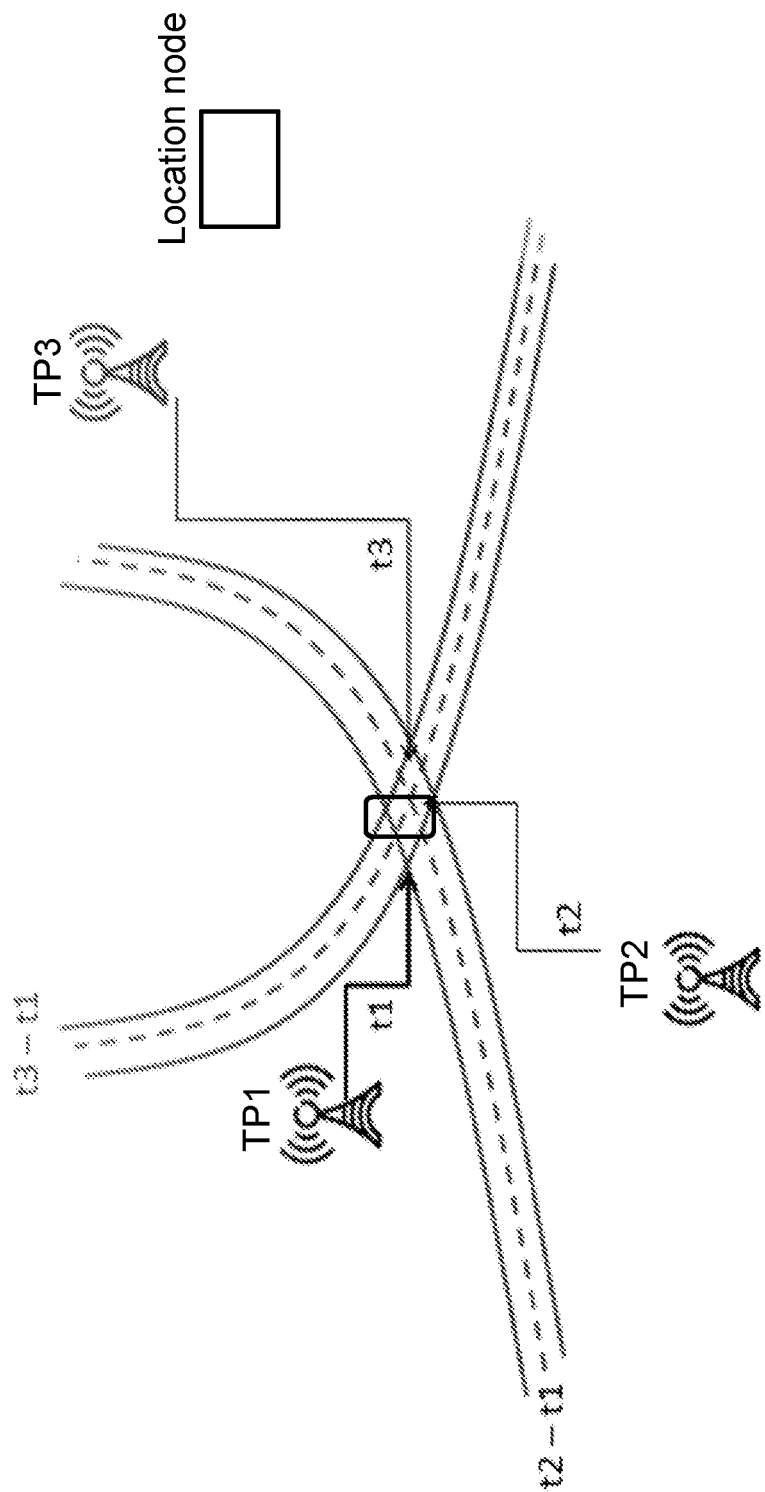
FIG. 2 is a schematic overview depicting OTDOA position estimation based on multilateration of the RSTD measurements according to prior art.
Figure 3:
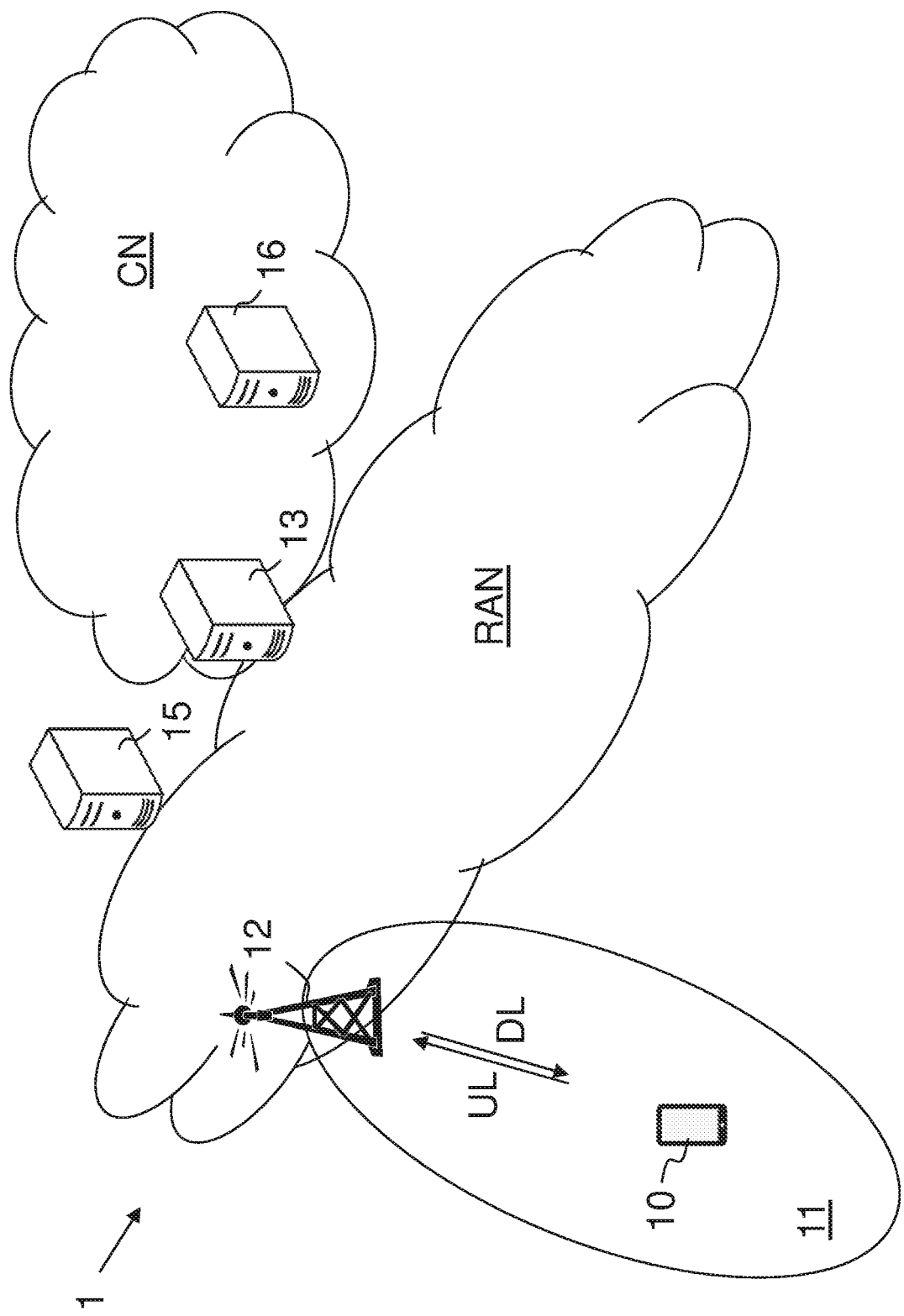
FIG. 3 is a schematic diagram depicting a wireless communications network according to embodiments herein.

Embodiments herein relate to wireless communications networks in general. FIG. 3 is a schematic overview depicting a wireless communications network 1. The wireless communications network 1 comprises one or more RANs and one or more CNs. The wireless communications network 1 may use one or a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in an Internet of Things (IoT) or MTC context, however, embodiments are also applicable in further development of the existing wireless communications networks such as e.g. WCDMA and LTE, but also future wireless communications networks such as 5G e.g. New radio (NR).

In the wireless communications network 1, a wireless device 10, such as a mobile station, a non-access point (non-AP) STA, a station (STA), a user equipment and/or a wireless terminal, may communicate via one or more Access Networks (AN), e.g. a RAN, to one or more core networks (CN). It should be understood by the skilled in the art that "wireless device" is a non-limiting term which means any terminal, wireless communications terminal, user equipment, IoT device, Machine Type Communication (MTC) device, Device to Device (D2D) terminal, or node e.g. smart phone, laptop, mobile phone, sensor, relay, mobile tablets or even a small base station communicating within a cell.

The wireless communications network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an access controller, a base station e.g. a radio base station such as a gNodeB, NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

The wireless communications network 1 may comprise a number of network nodes or core network nodes. For example, the wireless communications network 1 may comprise a controlling network node 13 such as a Mobility Management Entity (MME), a Serving General Packet Radio Service (GPRS) Support Node (SGSN), an Access and Mobility Management Function (AMF) node, a server keeping track of wireless devices, or similar. The controlling network node 13 controls or manages wireless devices in service areas in the wireless communications network 1. The wireless communications network 1 may further comprise a location node 15, such as an e-SMLC or a location management function (LMF) node, for positioning wireless devices or assisting in positioning wireless devices in the wireless communications network. The wireless communications network 1 may in addition comprise another network node 16 such as a an Operation and Maintenance (OAM) node, a gateway, a location controlling node, a Gateway Mobile Location Centre (GMLC) configured to retrieve location or position of wireless devices in wireless communications network 1. The location node 15, the radio network node 12 and the other network node 16 are all examples of network nodes and are commonly denoted network nodes.

Figure 12B:
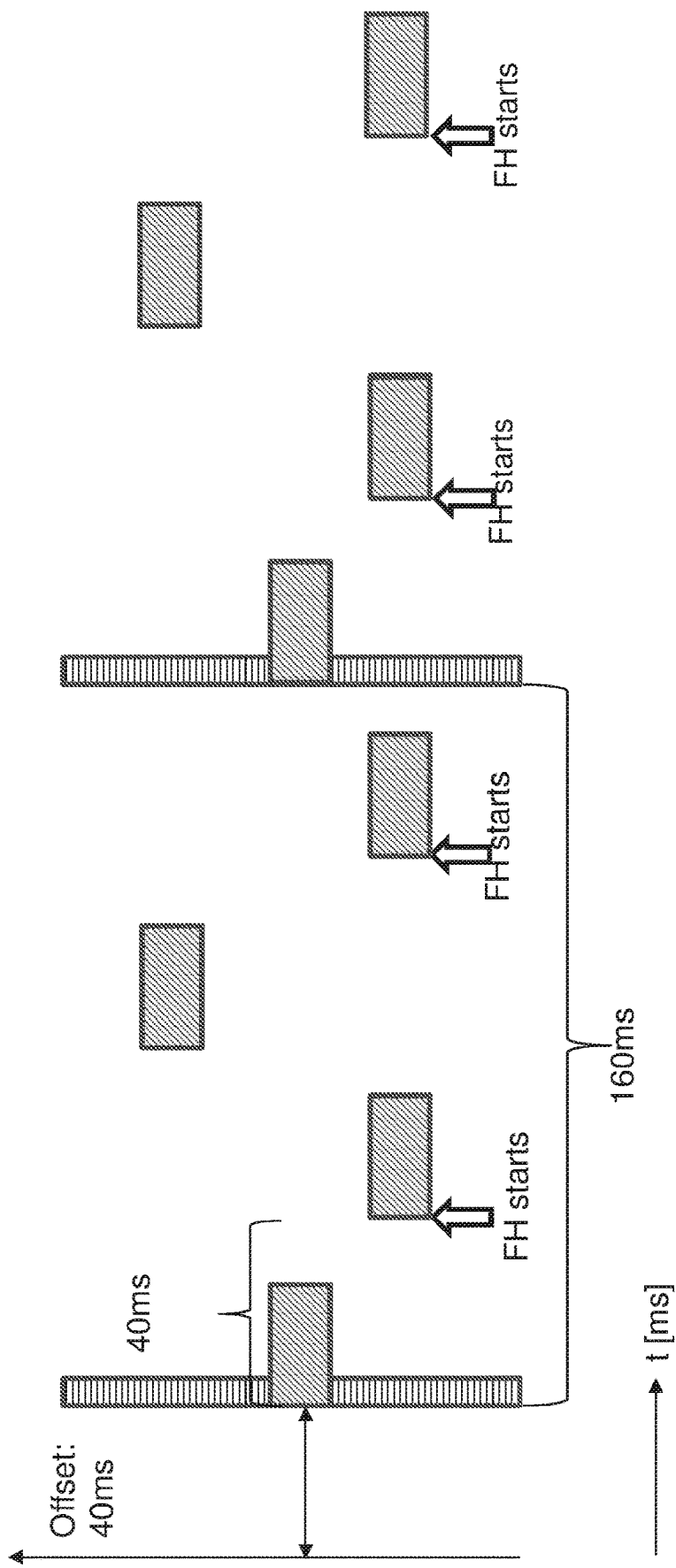
FIG. 12b is a schematic overview depicting a second PRS configuration.

According to some embodiments herein the wireless devices 10 may, either on demand or initiated from the wireless device side, send information, also referred to as capability information, about a support for multiple PRS configurations associated to the same service area or radio network node. Thus, the wireless device 10 may signal to a network node information indicating whether the wireless device supports multiple PRS configurations or not. The different PRS configurations may be characterized by different bandwidths, different number of subframes, different number of additional PRS occasions, and/or frequency hopping or not etc. The PRS configuration can also be specific for some bandwidths, such as specific configuration for NB-IoT devices or specific for a second access technology such as LTE. FIGS. 12a and 12b provide examples of multiple PRS configurations. In order to separate these in the signalling between the network node and the wireless device, each PRS configuration may be associated to a PRS configuration identifier. The PRS configuration identifier may be set for all possible PRS configurations, or specifically per type. For example, the PRS configurations may be listed as identifier per PRS configuration, and in addition there may be one PRS configuration defined as for different RATs such as one for legacy LTE, and one for NB-IoT.

According to embodiments herein the wireless device 10 obtains, from a network node such as the location node 15 or the radio network node 12, assistance data, also referred to as a configuration, comprising two or more PRS configurations associated with the radio network node 12 or the service area of the radio network node 12. The wireless device 10 then indicates back to the network node a scope of usage of the two or more PRS configurations with an indication, e.g. indicating which of and/or how are the PRS configurations used. The network node then uses the indication in a positioning related process such as estimating the position of the wireless device 10, or determining the relevance of configuring two or more PRS configurations. The network node may also take into account the obtained capability information from the wireless device when using the indication in the positioning related process. For example, may determine that all indications are coming from wireless devices not supporting multiple PRS configurations and thus determine to further use multiple PRS configurations for capable wireless devices.

An advantage with embodiments herein is that the network node is enabled to e.g. determine whether use of two or more PRS configurations is relevant based on one or more obtained indications about the scope of usage of the used PRS configurations. Additionally or alternatively, the network node such as the location node 15 may consider the scope of usage of the used PRS configurations when assessing measurements from wireless devices to ensure that the different measurements are weighted appropriately in the positioning estimation. This may lead to a more accurate positioning of the wireless device 10.

The method actions performed by the wireless device 10 for managing (or enabling) positioning of the wireless device 10 in the wireless communications network data according to some embodiments will now be described with reference to a flowchart depicted in FIG. 4a. Managing positioning may mean enabling positioning of the wireless device, enabling determining statistics related to a position of the wireless device, and/or enabling positioning e.g. determining PRS configurations to use. The actions do not have to be taken in the order stated below, but may be taken in any suitable order. Actions performed in some embodiments are marked with dashed boxes.

Action 400. The wireless device 10 may send, to the network node or another network node, information about the support for using multiple PRS configurations associated to a same service area or radio network node. The wireless device 10 may e.g. optionally indicate, to the network node such as the location node 15, its capabilities for supporting multiple PRS configurations. The information may be sent using LPP and/or RRC signalling.

Action 401. The wireless device 10 obtains, from the network node such as the location node 15 or the radio network node 12, the assistance data, also referred to as a configuration, comprising the two or more PRS configurations associated with the radio network node 12 or the service area of the radio network node 12. The PRS configurations of the two or more PRS configurations may be characterized by different bandwidths, different number of subframes, different number of additional PRS occasions, and/or frequency hopping or not etc. The wireless device may obtain the assistance data by receiving the assistance data from the network node, e.g. as an LPP or RRC message.

Action 402. The wireless device 10 may then use one or more out of the two or more PRS configuration for measurements on PRSs. Thus, the wireless device 10 may use the obtained configuration for measurements, e.g. PRS measurements.

Action 403. The wireless device 10 indicates, to the network node, the scope of usage of the two or more PRS configurations with the indication. Thus, the wireless device 10 indicates, e.g. transmits an indication, the scope of usage of the used two or more PRS configurations to the network node. The indication may indicate that less than all PRS configurations have been used. The indication may define how the PRS configurations are used at the wireless device 10. The indication may be an index or a real value. The indication may be sent in an RRC message or an LPP message.

The method actions performed by the network node 41, such as the location node 15, the radio network node 12 or the other network node 16, for handling positioning of the wireless device 10 in the wireless communications network data according to some embodiments will now be described with reference to a flowchart depicted in FIG. 4b. Handling positioning meaning e.g. positioning the wireless device, determining statistics related to a position of the wireless device, and/or enabling positioning e.g. determining PRS configurations to use. The actions do not have to be taken in the order stated below, but may be taken in any suitable order. Actions performed in some embodiments are marked with dashed boxes.

Action 410. The network node such as the location node 15 may optionally obtain, from the radio network node 12 information about multiple PRS configurations associated to a served cell.

Action 415. The network node may moreover optionally obtain, from the wireless device 10, information about supported capabilities associated to multiple PRS configurations.

Action 420. The network node transmits to the wireless device 10, assistance data comprising two of more PRS configurations associated with the radio network node 12 or with the service area of the radio network node 12. Thus, the radio network node 12 may send a configuration or assistance data comprising two of more PRS configurations associated to a cell or with the radio network node 12, i.e. the PRS configuration of a cell or a radio network node. The assistance data may be comprised in an RRC message or LPP message.

Action 430. The network node receives, from the wireless device 10 the indication indicating the scope of usage of the two of more PRS configurations. For example, the indication may indicate that all PRS configurations have been used; only the first PRS configuration and/or the second PRS configuration was used for performing measurement on; or no PRS configurations have been used.

Action 440. The network node uses the indication in a positioning related process e.g. the network node may estimate the position of the wireless device 10 based on the received indication. Thus, the positioning related process may be a process for positioning the wireless device and the network node may estimate the position of the wireless device based on the received indication e.g. the multilateration of the RSTD measurements sent by the wireless device is taking the indication into account. The positioning related process may be a process for deciding whether to configure multiple PRS configurations in one or more regions. If there are not many wireless devices benefiting from this feature, the network node may determine to omit the multiple PRS configuration transmissions which cost both in money, resources and energy. The positioning related process may be a process for determining statistics of multiple PRS configurations. The network node may compile statistics network wide or per region based on the indication. The statistics can be used from one region to decide whether to configure multiple PRS configurations in another region, or to decide to disable multiple PRS configurations if the benefits are considered less compared to the costs of transmitting multiple PRS configurations. Statistics may be in terms of number of positioning request from wireless devices with certain different bandwidth capabilities and that may suggest the benefit of having PRS configuration with those bandwidths and enabling the multiple PRS configuration feature for that particular network node. The network node may also make assessments about the accuracy and/or relevance of the measurements from a wireless device based on such indications. Measurements where less than all PRS configurations have been used are considered less accurate than measurements where all PRS configurations have been used. The indicated measurement quality from the wireless device 10 can also be assessed in a similar manner, where the relevance attributed to the quality statement is determined based on the indication from the wireless device 10 indicating the scope.

A PRS configuration may comprise:
PRS bandwidth
Number of consecutive DL frames (N_PRS)
PRS configuration index (I_PRS)
PRS periodicity (T_PRS)
PRS subframe offset (Delta_PRS)
PRS muting sequence length
PRS muting sequence In a more complex wireless communication network, in which the wireless communication network behavior changes drastically and dynamically over time, it can be assumed that the PRS configuration can be also changed on the fly. Thus, the location node 15 may send an update of a new configured value for each of the parameters to the radio network node 12, and also assist the wireless device 10 with new setting parameters. In one embodiment the radio network node 12 may acknowledge the ability of changing the PRS configuration parameter setting to the location node 15 prior to any assistance data sent to the wireless device 10. Embodiments herein may switch between pre-configured PRS configurations through network signalling.

Figure 5:
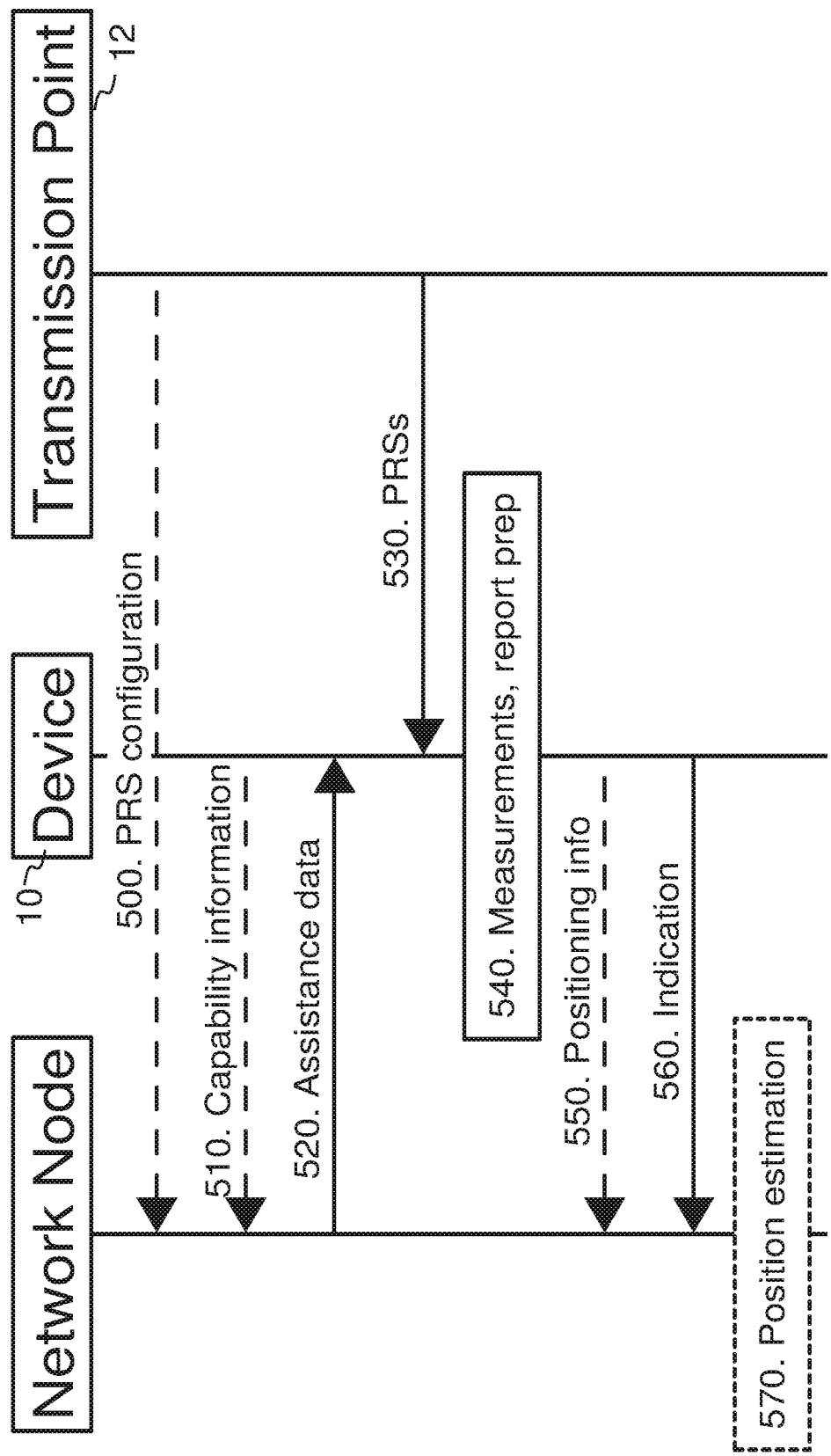
FIG. 5 is a combined flowchart and signalling scheme according to embodiments herein.

FIG. 5 is a combined flowchart and signalling scheme according to embodiments herein.

Action 500. The radio network node 12, such as a base station and/or a transmission point, may optionally signal its configuration comprising two or more PRS configurations of a cell.

Action 510. The wireless device 10 optionally signals its capabilities to the network node, which capability indicates whether the wireless device 10 supports multiple PRS configurations or not. The wireless device 10 may thus send, to the network node or another network node, information about the support for using multiple PRS configurations associated to the same service area or radio network node.

Action 520. The network node sends assistance data to the wireless device 10 which assistance data comprises the two or more PRS configurations associated to the service area or the radio network node 12.

Action 530. The wireless device 10 detects PRSs from the radio network node 12 related to the obtained two or more PRS configurations. The wireless devices may thus monitor for PRSs using one or more of the two or more PRS configurations.

Action 540. The wireless device 10 may thus use the obtained assistance data to make measurements and prepare, also referred to as compile or create, a report comprising the measurements. Hence, the wireless device 10 may use one or more out of the two or more PRS configuration for performing measurements on PRSs.

Action 550. The wireless device 10 may optionally send positioning information comprising the measurements to the network node such as the location node 15. For example, the wireless device may then transmit the positioning information, such as measurements, to the location node 15.

Action 560. According to embodiments herein, the wireless device 10 provides, to the network node, the indication indicating the scope of usage of the used two or more PRS configurations. For example, when the wireless device 10 has scanned for PRSs according to the two or more PRS configurations, it may have detected some PRSs, but not all PRSs of the PRS configurations associated with the service area. Therefore, the wireless device 10 indicates the scope of usage of the used two or more PRS configurations to the network node. In one embodiment, the scope of the used two or more PRS configurations is indicated via a list of the used PRS configurations. The list may contain PRS configurations for the same or different radio technologies, bandwidths, configurations etc.

Additionally or alternatively, the scope of usage of the used PRS configuration may be indicated by an indicator informing that less than all PRS configurations has been used, or how much or which parts of the PRS configurations have been used.

The indication may be represented as an error, with an error cause, indicating that fewer than all PRS configurations have been used. The indication may further be per cell, or one indication for all cells.

Action 570. The network node may exploit or use the obtained indication(s) to e.g. estimate the wireless device position.

Based on the capability information and/or the indication about the scope of usage of the used PRS configurations, the network node can compile statistics about The support for multiple PRS configurations by wireless devices
The usefulness of multiple PRS configurations The statistics can be compiled network wide or per a region comprising a one or more radio network nodes. The statistics may be used from one region to decide whether to configure multiple PRS configurations in another region, or to decide to disable multiple PRS configurations if the benefits are considered less compared to the costs of transmitting multiple PRS configurations.

The network node may also make assessments about the accuracy and/or relevance of the measurements from the wireless device 10 based on such indications of scope of usage. Measurements where less than all PRS configurations have been used are considered less accurate than measurements where all PRS configurations have been used. The indicated measurement quality from the wireless device 10 may also be assessed in a similar manner, where the relevance attributed to the quality statement is determined based on the indication from the wireless device 10 indicating the scope.

Embodiments herein let the wireless device 10 provide the indication of the scope of usage of the used PRS configurations in case two or more PRS configurations are defined. Thereby, the positioning estimation and/or the PRS configuration management at the network node may be refined based on the received indication of the scope of usage.

FIG. 6 provides an exemplifying embodiment of such capability indications that the wireless device can use to send capability information to the network node to indicate the support of multiple PRS configurations e.g. a supportedNoCePrsConfigs-r14 parameter.

FIG. 7 shows example of PRS configurations, where each PRS configuration is associated with an identifier, thus, illustrating an exemplifying embodiment with such identifiers for PRS configurations e.g. denoted as cePrs-ConfigurationIndex-r14.

One exemplifying embodiment of the indication of the scope of usage of the two or more PRS configurations being a list is illustrated by FIGS. 8a-8b. FIG. 8a shows an example of signal measurement information, wherein a list of identifiers associated to used PRS configurations identifiers may be included e.g. a list denoted as usedPrsConfig-ListRef-r14. FIG. 8b shows a continued example of signal measurement information, wherein a list of identifiers associated to used PRS configurations identifiers may be included. Thus, the indication may be PRS configuration identifiers of used PRS configurations.

The indication indicating the scope of usage of the two or more PRS configurations may be per cell, or one indication for all cells as in FIG. 9. FIG. 9 shows an example wherein the indication is an OTDOA target device error cause that it was not possible to measure all PRS configurations. Thus, the indication may be an error cause indicating that one or more PRS configurations are not used e.g. denoted as unableToMeasureSomePrsConfigurations.

Figure 10:
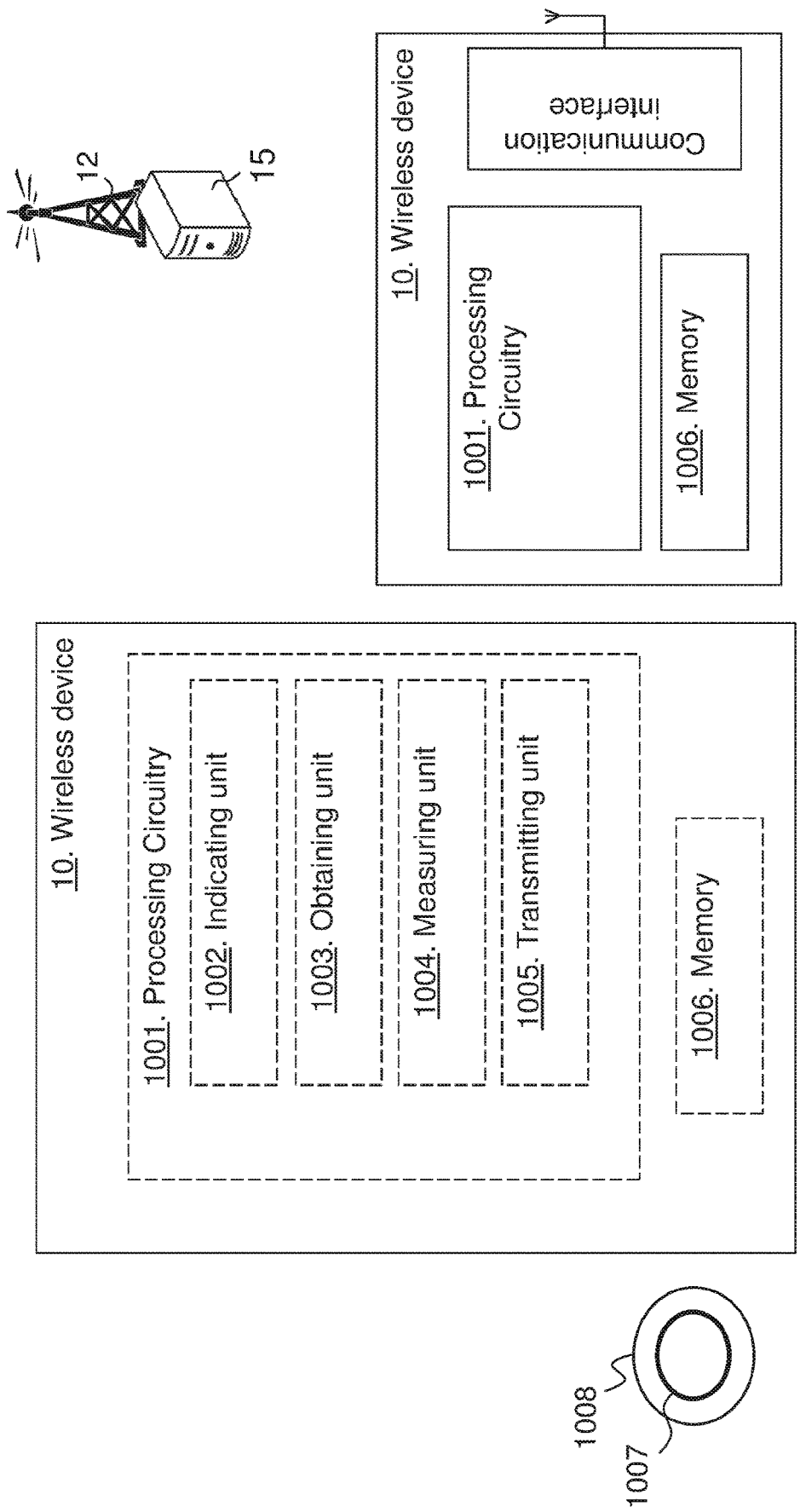
FIG. 10 is a schematic block diagram depicting a wireless device according to embodiments herein.

FIG. 10 is a schematic block diagram depicting the wireless device 10 for enabling or managing positioning of the wireless device in the wireless communications network.

The wireless device 10 may comprise a processing circuitry 1001, e.g. one or more processors, configured to perform the methods herein.

The wireless device 10 may comprise an indicating unit 1002. The wireless device 10, the processing circuitry 1001, and/or the indicating unit 1002 may be configured send information about a support for using multiple PRS configurations associated to a same service area or radio network node. E.g. the wireless device 10, the processing circuitry 1001, and/or the indicating unit 1002 may be configured to indicate, to the network node such as the location node 15, the controlling network node, or the other network node, its capabilities when it comes to support multiple PRS configurations.

The wireless device 10 may comprise an obtaining unit 1003, such as a receiver or transceiver. The wireless device 10, the processing circuitry 1001, and/or the obtaining unit 1003 is configured to obtain from the network node assistance data comprising two or more PRS configurations associated with the radio network node 12 or the service area of the radio network node 12. E.g. obtain, from the location node 15 or the radio network node 12, a configuration comprising the two or more PRS configurations associated with the radio network node 12. The PRS configurations of the two or more PRS configurations may be characterized by different bandwidths, different number of subframes, different number of additional PRS occasions, and/or frequency hopping or not etc.

The wireless device may comprise a measuring unit 1004. The wireless device 10, the processing circuitry 1001, and/or the measuring unit 1004 may be configured to use one or more out of the two or more PRS configuration for measurements on PRSs. E.g. the wireless device 10, the processing circuitry 1001, and/or the measuring unit 1004 may be configured to, based on the assistance data, measure positioning information e.g. performs RSTD measurements on PRSs as indicated by the two or more PRS configurations. Hence, the wireless device 10, the processing circuitry 801, and/or the measuring unit 1004 may be configured to use the obtained configuration for measurements, e.g. PRS measurements.

The wireless device may comprise a transmitting unit 1005, a transmitter or a transceiver. The wireless device 10, the processing circuitry 1001, and/or the transmitting unit 1005 are configured to indicate to the network node the scope of usage of the two or more PRS configurations with the indication. E.g. configured to transmit, to the network node, an indication indicating the scope of usage of the used two or more PRS configurations. The indication may indicate that less than all PRS configurations have been used. The indication may define how the PRS configurations are used at the wireless device 10. The indication may be an index or a real value.

The wireless device 10 further comprises a memory 1006 comprising one or more memory units. The memory 1006 comprises instructions executable by the processing circuitry 1001 to perform the methods herein when being executed in the wireless device 10. The memory 1006 is arranged to be used to store e.g. information, data such as PRS configurations, scope of usage, measurements, PRS information, etc.

The wireless device 10 may further comprise a communication interface such as transmitter, receiver, transceiver and/or one or more antennas.

The methods according to the embodiments described herein for the wireless device 10 are respectively implemented by means of e.g. a computer program 1007 or a computer program product, comprising instructions, i.e., software code portions, which, when executed on at least one processor, cause the at least one processor to carry out the actions described herein, as performed by the wireless device 10. The computer program 1007 may be stored on a computer-readable storage medium 1008, e.g. a disc or similar. The computer-readable storage medium 1008, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 11:
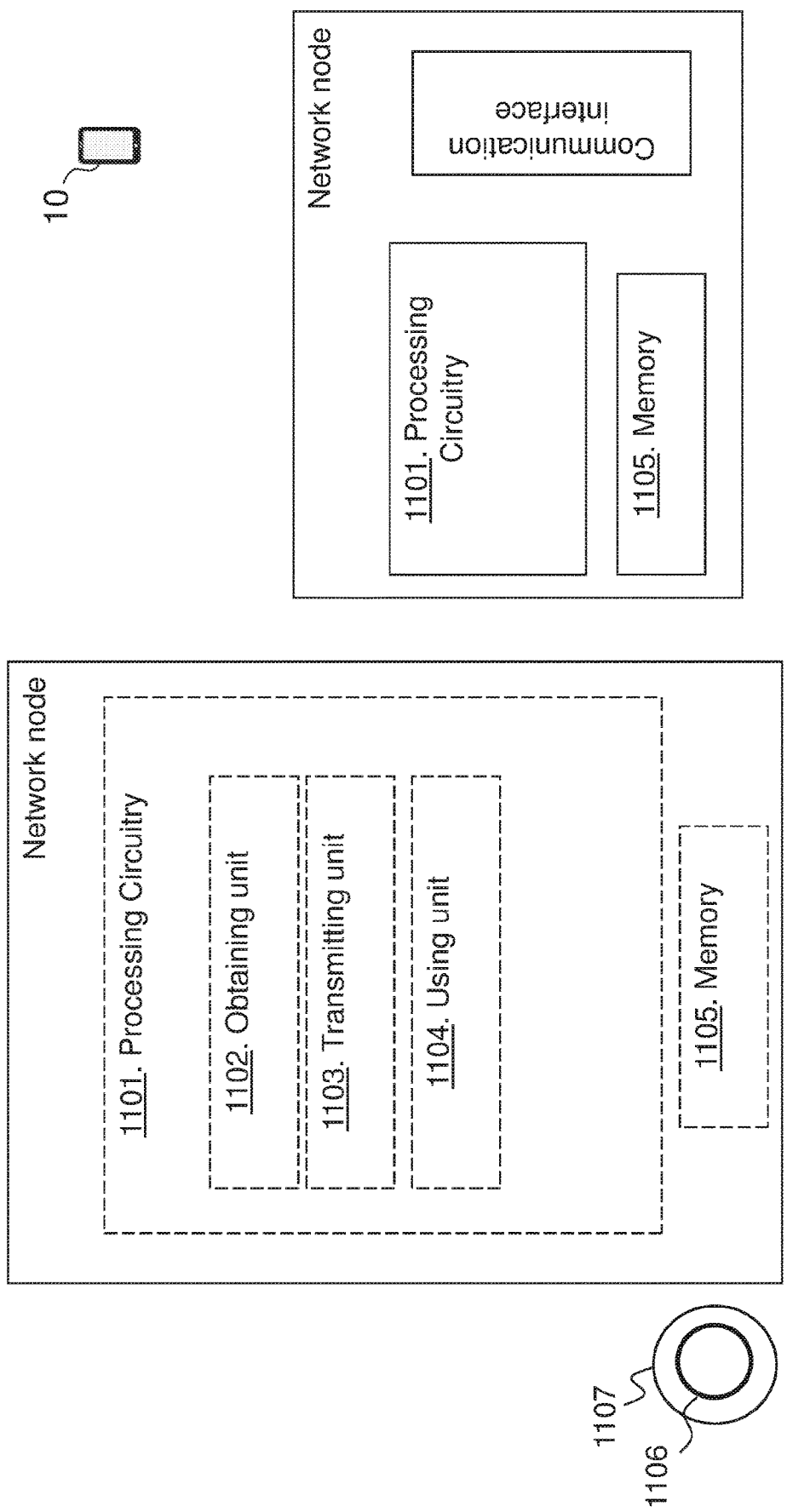
FIG. 11 is a schematic block diagram depicting a network node according to embodiments herein.

FIG. 11 is a schematic block diagram depicting the network node such as the location node 15, the radio network node 12 or the other network node 16, for handling positioning of the wireless device in the wireless communications network.

The network node may comprise a processing circuitry 1101, e.g. one or more processors, configured to perform the methods herein.

The network node may comprise an obtaining unit 1102, e.g. a receiver or a transceiver. The network node, the processing circuitry 1101, and/or the obtaining unit 1102 may be configured to obtain, from the radio network node 12 information about multiple PRS configurations associated to a served cell. The network node, the processing circuitry 1101, and/or the obtaining unit 1102 may be configured to obtain e.g. receive, from the wireless device, information about supported capabilities associated to multiple PRS configurations.

The network node may comprise a transmitting unit 1103, e.g. a transmitter or transceiver. The network node, the processing circuitry 1101, and/or the transmitting unit 1103 is configured to transmit, to the wireless device 10, assistance data comprising two of more PRS configurations associated with the radio network node 12 or with the service area of the radio network node 12. Thus, the network node, the processing circuitry 1101, and/or the transmitting unit 1103 may be configured to transmit or send assistance data comprising two of more PRS configurations associated with a cell or with the radio network node 12.

The network node, the processing circuitry 1101, and/or the obtaining unit 1102 is configured to receive from the wireless device 10, the indication indicating the scope of usage of the two of more PRS configurations.

The network node may comprise a using unit 1104. The network node, the processing circuitry 1101, and/or the using unit 1104 is configured to use the indication in a positioning related process. Thus, the network node, the processing circuitry 1101, and/or the using unit 1104 may be configured to use the received indication when performing a positioning related process e.g. positioning the wireless device 10 or setting up PRS configurations. The positioning related process may be a process for positioning the wireless device and the network node, the processing circuitry 1101, and/or the using unit 1104 may be configured to estimate the position of the wireless device 10 based on the received indication. The positioning related process may be a process for deciding whether to configure multiple PRS configurations in one or more regions. Alternatively the positioning related process may be a process for determining statistics of multiple PRS configurations.

The network node, the processing circuitry 1101, and/or the obtaining unit 1102 may be configured to receive, from the wireless device 10, information about a support for using multiple PRS configurations associated to a same service area or radio network node. The network node, the processing circuitry 1101, and/or the using unit 1104 may then be configured to use the received information in the positioning related process. The network node, the processing circuitry 1101, and/or the obtaining unit 1102 may be configured to receive positioning information from the device, such as measurements.

The network node further comprises a memory 1105 comprising one or more memory units. The memory 1105 comprises instructions executable by the processing circuitry 1101 to perform the methods herein when being executed in the network node. The memory 1105 is arranged to be used to store e.g. information, data such as PRS configurations, position estimates, positioning information, indications of scope of usage, etc.

The network node may further comprise a communication interface such as transmitter, receiver, transceiver and/or one or more antennas.

The methods according to the embodiments described herein for the network node are respectively implemented by means of e.g. a computer program 1106 or a computer program product, comprising instructions, i.e., software code portions, which, when executed on at least one processor, cause the at least one processor to carry out the actions described herein, as performed by the network node. The computer program 1106 may be stored on a computer-readable storage medium 1107, e.g. a disc or similar. The computer-readable storage medium 1107, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

As will be readily understood by those familiar with communications design, that functions means or units, also referred to as modules, may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional units of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

The wireless communication network may support e.g. up to three PRS configurations, where each PRS configuration is associated with a set of parameters. Two examples of such PRS configurations are illustrated by FIGS. 12*a* and 12*b*. The PRS configurations in this example differ in the configured PRS bandwidth, the number of subframes used for the PRS, whether optional PRS occasions are configured within one PRS period or only one, and whether PRS frequency hopping is configured or not. FIG. 12*a* shows how it is possible to extend a previous LTE PRS which was expanded in the whole bandwidth with multiple other narrower bandwidth PRS configurations. With narrowing the bandwidth we should increase the number of subframes in which the PRS is transmitted. FIG. 12*a* shows different PRS configurations including a 20 MHz, 160 ms periodicity PRS (horizontally striped) where each positioning occasion is one sub-frame, a 5 MHz PAS with occasions of two sub-frames and 80 ms periodicity (vertically striped), and a 1.4 MHz PRS with occasions of four sub-frames and 40 ms periodicity (diagonally striped), FIG. 12b shows how frequency hopping which is an optional feature can be used by transmitting the narrower bandwidth PRS, e.g. 1.4 MHz PRS, in different frequencies giving more frequency diversity to the PRS configurations which gives the potential to explore the bandwidth in a more efficient way and/or to reduce the interference.

Information Elements

OTDOA Assistance Data Elements

This is an example of the transmitted configuration from the network node to the wireless device 10; see actions 401 and 420 above. The wireless communication network may support e.g. up to three PRS configurations, where each PRS configuration is associated with a set of parameters. An example set of PRS configurations is illustrated by the FIG. 12B. The reasonable representation of the PRS configurations is to use the same PRS configuration index, same PRS ID and same muting pattern, implying that all PRS configurations align with the same overall PRS period and subframe offset. The number of subframes in a PRS occasion may vary between PRS configurations, but the first PRS subframe is aligned. In addition it is possible to have additional Coverage Enhancement (CE) PRS occasions within the PRS period, separated by the CE PRS period.

Thus, the PRS configuration index, the PRS muting pattern and the PRS ID may be shared between the PRS configurations.

Given the possibility of additional CE PRS occasions every CE PRS period, it is not possible to configure these PRS configurations with all possible PRSs that have been introduced for PRS-based Transport Block Size (TBS). Therefore, it is reasonable to introduce a new PRS information element, cePRS-Info, to represent the up to three PRS configurations.

The other parameters are specific per PRS configuration, including the PRS bandwidth, number of PRS subframes per occasion, CE PRS period for the optional additional CE PRS occasions, and CE PRS frequency hopping. In order to separate the different CE PRS configurations, it is proposed to introduce a CE PRS Configuration identifier, cePrsConfigID-r14, indicating the PRS configuration.

OTDOA Location Information Elements

This is an example of the transmitted indication indicating scope of usage from the wireless device 10 to the network node; see actions 403 and 430 above. The Signal Measurement Information IE can be used also for reporting of Reference Signal Time Difference (RSTD) based on the CE PRS Configurations. Given that the target device can be configured with multiple CE PRS configurations, it is relevant for the location node 15 to be aware of which out of the configured CE PRS Configurations the wireless device 10 really used for the RSTD estimation. According to embodiments herein the wireless device transmits the indication of the scope of usage of the two or more PRS configurations e.g. the wireless device 10 may include a field with a list of the used PRS configurations, including also the legacy LTE PRS, e.g. configured via the PRS-Info, the CE PRS configurations configured via the cePRS-Info, and the NB-IoT_PRS configuration, configured via nbPRS-Info. If this field is missing, then the wireless device 10 is assumed to have utilized all configured PRS configurations. Hence the wireless device may reports the used PRS configurations in case less than all PRS configurations have been used.

OTDOA Error Elements

The wireless device 10 may also indicate, in the action 440, if the wireless device was unable to measure some of the configured CE PRS configurations. The proposed OTDOA target device error cause is unableToMeasureSomePrsConfigurations. Some embodiments herein introduce an OTDOA target device error cause unableToMeasureSomePrsConfigurations to represent when the device is unable to measure all configured CE PRS Configurations. This is also an indication of the scope of usage.

OTDOA Capability Information

The wireless device 10 may transmit these information elements to indicate capability as described in action 400. Given the introduced new CE PRS configurations, some embodiments introduce capability handling. The following capabilities may be reported:

ceDensePrsConfig—if supported, the wireless device 10 supports additional CE PRS occasions within the PRS period, separated by the CE PRS period.

supportedNoCePrsConfigs—number of supported CE PRS Configurations at the wireless device 10. If excluded, the wireless device 10 is assumed to not support CE PRS configurations.

supportedPrsBandwidth—widest supported PRS bandwidth at the wireless device cePrsFrequencyHopping—if supported, the wireless device 10 supports CE PRS frequency hopping Embodiments herein may introduce the capabilities ceDensePrsConfig, supportedNoCePrsConfigs, supportedPrsBandwidth, cePrsFrequencyHopping to indicate support for the CE PRS Configurations.

cePRS-Info

This is an example of the PRS configuration as transmitted in action 420 The IE cePRS-Info provides the information related to configuration for CE devices of PRS configurations in a cell.

```
-- ASN1START
cePRS-Info-r14 ::= SEQUENCE {
    cePrs-ConfigurationIndex-r14      INTEGER (0..4095),
    cePRS-MutingInfo-r14              CHOICE {
        po2-r9                            BIT STRING (SIZE(2)),
        po4-r9                            BIT STRING (SIZE(4)),
        po8-r9                            BIT STRING (SIZE(8)),
        po16-r9                           BIT STRING (SIZE(16)),
        ...
    }                                                              OPTIONAL,     -- Cond
NotSameAsPRS0
    cePrsID-r14                       INTEGER (0..4095)            OPTIONAL,     -- Need ON
    cePrsConfigList-r14               CePrsConfigList-r14,
    ...
}
CePrsConfigList-r14 ::= SEQUENCE (SIZE (1..3)) OF CePrsConfig-r14
CePrsConfig-r14 ::= SEQUENCE {
    cePrsConfigID-r14                 INTEGER (1..3),
    cePrs-Bandwidth-r14               ENUMERATED { n6, n15, n25, n50, n75, n100, ... },
```

-continued

```
        ceNumDL-Frames-r14          ENUMERATED {sf-1, sf-2, sf-4, sf-6, sf-10, sf-20, sf-40,
sf-80, sf-160, ...},
        cePrsPeriod-r14             ENUMERATED {sf-10, sf-20, sf-40, sf-80, ... }
                                                                            OPTIONAL,       -- Cond CE-
PRS
        cePrsFhConfig-r14           ENUMERATED {nb-2, nb-4, ...}            OPTIONAL,       -- Cond CE-
FH
        cePrsFhNarrowbandsList-r14  CePrsFhNarrowbandsList-r14                              -- Cond CE-
FH
}
CePrsFhNarrowbandsList-r14 ::= SEQUENCE (SIZE(1..3)) OF CePrsNarrowband-r14
CePrsFhNarrowband-r14 ::= SEQUENCE {
        cePrsFhNarrowband-r14       INTEGER (1..maxAvailCeNarrowBands-r14)
}
maxAvailNarrowBands-r14             INTEGER ::= 16 -- Maximum number of narrowbands
-- ASN1STOP
```

| Conditional presence | Explanation |
|---|---|
| NotSameAsPRS0 | The field is mandatory present if the muting pattern is not the same as the muting pattern defined by prs-MutingInfo-r9 in prsInfo if available; otherwise it is not present. |
| CE-FH | The field is mandatory present if frequency hopping is used for the CE PRS configuration; otherwise it is not present. |
| CE-PRS | The field is mandatory present if additional CE PRS occasions are used within a PRS period; otherwise it is not present. | cePRS-Info field descriptions cePrs-ConfigurationIndex
This field specfies the positioning reference signals configuration index $I_{PRS}$ as defined in [16]. If defines the subframe offset and the PRS period $T_{PRS}$ of the PRS configuration.
cePrs-MutingInfo
This field specifies the CE PRS muting configuration of the cell. The PRS muting configuration is defined by a periodic PRS muting sequence with periodicity $T_{REP}$ where $T_{REP}$, counted in the number of PRS occasions [18], can be 2, 4, 8 or 16 which is also the length of the selected bit string that represents this PRS muting sequence. If a bit in the PRS muting sequence is set to "0", then all the CE PRS occasions are muted in the corresponding PRS period. A PRS positioning occasion comprises of one or more CE PRS occasions repeated every cePrsPeriod. Each CE PRS occasion includes $N_{CEPRS}$ downlink positioning subframes as defined in [16]. The first bit of the PRS muting sequence corresponds to the first PRS positioning occasion that starts after the beginning of the assistance data reference cell SFN = 0. The sequence is valid for all subframes after the target device has received the cePrs-MutingInfo. If this field is not present the target device may assume that the PRS muting is not in use for the cell.
When the SFN of the assistance data reference cell is not known to the UE and cePrs-MutingInfo is provided for a cell in the OTDOA-NeighbourCellInfoList IE, the UE may assume no PRS is transmitted by that cell.
When the UE receives a 16-bit muting pattern (po16-r9) and PRS periodicity T_PRS of 1280 subframes for the same cell, the UE shall assume an 8-bit muting pattern (po8-r9) based on the first half of the 16-bit muting pattern
cePrsID
This field specifies the PRS-ID as defined in [16].
cePrs-Bandwidth
This field specifies the bandwidth that is used to configure the positioning reference signals on. Enumerated values are specified in number of resource blocks (n6 corresponds to 6 resource blocks, n15 to 15 resource blocks and so on) and define 1.4, 3, 5, 10, 15 and 20 MHz bandwidth.
ceNumDL-Frames
This field specifies the number of consecutive downlink subframes $N_{PRS}$ with positioning reference signals, as defined in [16]. Enumerated values define 1, 2, 4, 6, 10, 20, 40, 80, 160 consecutive downlink subframes.
cePrsConfigID
This field specifies the index of the CE PRS configuration.
cePrsPeriod
This field specifies the reduced CE PRS occasion period $N_{CEPRS}$ for additional CE PRS occasions within the PRS period defined by the cePrs-ConfigurationIndex.
cePrsFhConfig
This field specifies the frequency hopping configuration of the CE PRS configuration, where nb-2 means hopping between two narrowbands and nb-4 hopping between four narrowbands.
cePrsFhNarrowbandsList
This field specifies the narrowbands with CE PRS configured for frequency hopping.
cePrsFhNarrowband
This field indicates the index of a narrowband used in the CE device frequency hopping pattern, see TS 36.211 [16, 6.4.1] and TS 36.213 [28, 7.1.6]. Field values (1 . . . maxAvailNarrowBands-r14) correspond to narrowband indices (0 . . . [maxAvailNarrowBands-r14-1]) as specified in TS 36.211 [16].

OTDOA-SignalMeasurementInformation
This is an example of the message transmitted in action 403. The IE OTDOA-SignalMeasurementInformation is used by the wireless device 10 to provide RSTD measurements to e.g. the location node 15. The RSTD measurements are provided for a neighbour cell and the RSTD reference cell, both of which are provided in the IE OTDOA-ProvideAssistanceData. The RSTD reference cell may or may not be the same as the assistance data reference cell provided in OTDOA-ReferenceCellInfo. If the wireless device 10 stops reporting inter-frequency RSTD measurements, where the inter-frequency RSTD measurement is an OTDOA RSTD measurement with at least one cell on a frequency different from the serving cell frequency, the LPP layer shall inform lower layers that inter-frequency RSTD measurements are stopped.

NOTE: If there are more than 24 NeighbourMeasurementElement to be sent, the target device may send them in multiple ProvideLocationInformation messages, as described under sub-clause 5.3.

```
-- ASN1START
OTDOA-SignalMeasurementInformation ::= SEQUENCE {
    systemFrameNumber          BIT STRING (SIZE (10)),
    physCellIdRef              INTEGER (0..503),
    cellGlobalIdRef            ECGI                       OPTIONAL,
    earfcnRef                  ARFCN-ValueEUTRA           OPTIONAL,     -- Cond NotSameAsRef0
    referenceQuality           OTDOA-MeasQuality          OPTIONAL,
    neighbourMeasurementList   NeighbourMeasurementList,
    ...,
    [[ earfcnRef-v9a0          ARFCN-ValueEUTRA-v9a0      OPTIONAL      -- Cond NotSameAsRef1
    ]],
    [[ tpIdRef-r14             INTEGER (0..4095)          OPTIONAL,     -- Cond ProvidedByServer0
       prsIdRef-r14            INTEGER (0..4095)          OPTIONAL,     -- Cond ProvidedByServer1
       additionalPathsRef-r14
                               AdditionalPathList-r14     OPTIONAL
       usedPrsConfigListRef-r14
                               UsedPrsConfigList-r14      OPTIONAL      -- Cond ProvidedByServer2
    ]]
}
NeighbourMeasurementList ::= SEQUENCE (SIZE(1..24)) OF NeighbourMeasurementElement
NeighbourMeasurementElement ::= SEQUENCE {
    physCellIdNeighbour        INTEGER (0..503),
    cellGlobalIDNeighbour      ECGI                       OPTIONAL,
    earfcnNeighbour            ARFCN-ValueEUTRA           OPTIONAL,     -- Cond NotSameAsRef2
    rstd                       INTEGER (0..12711),
    rstd-Quality               OTDOA-MeasQuality,
    ...,
    [[ earfcnNeighbour-v9a0    ARFCN-ValueEUTRA-v9a0      OPTIONAL      -- Cond NotSameAsRef3
    ]],
    [[ tpIdNeighbour-r14       INTEGER (0..4095)          OPTIONAL,     -- Cond ProvidedByServer0
       prsIdNeighbour-r14      INTEGER (0..4095)          OPTIONAL,     -- Cond ProvidedByServer1
       delta-rstd-r14          INTEGER (0..5)             OPTIONAL,
       additionalPathsNeighbour-r14
                               AdditionalPathList-r14     OPTIONAL,
       usedPrsConfigListNeighbor-r14
                               UsedPrsConfigList-r14      OPTIONAL      -- Cond ProvidedByServer2
    ]]
}
AdditionalPathList-r14 ::= SEQUENCE (SIZE(1..maxPaths-r14)) OF AdditionalPath-r14
maxPaths-r14 INTEGER ::= 2
UsedPrsConfigList-r14 ::= SEQUENCE (SIZE(1..5)) OF UsedPRSConfig-r14
UsedPRSConfig -r14 ::= SEQUENCE {
    usedPrsConfig -r14 ENUMERATED {prs, cePrs1, cePrs2, cePrs3, nbPrs}
}
-- ASN1STOP
```

| Conditional presence | Explanation |
| --- | --- |
| NotSameAsRef0 | The field is absent if the corresponding earfcnRef-v9a0 is present. Otherwise, the target device shall include this field if the EARFCN of the RSTD reference cell is not the same as the EARFCN of the assistance data reference cell provided in the OTDOA assistance data. |
| NotSameAsRef1 | The field is absent if the corresponding earfcnRef is present. Otherwise, the target device shall include this field if the EARFCN of the RSTD reference cell is not the same as the EARFCN of the assistance data reference cell provided in the OTDOA assistance data. |
| NotSameAsRef2 | The field is absent if the corresponding earfcnNeighbour-v9a0 is present. Otherwise, the target device shall include this field if the EARFCN of this neighbour cell is not the same as the earfcnRef for the RSTD reference cell. |
| NotSameAsRef3 | The field is absent if the corresponding earfcnNeighbour is present. Otherwise, the target device shall include this field if the EARFCN of this neighbour cell is not the same as the earfcnRef for the RSTD reference cell. |
| ProvidedByServer0 | The target device shall include this field if a tpId for this transmission point is included in the OTDOA-ProvideAssistanceData. Otherwise the field is absent. |
| ProvidedByServer1 | The target device shall include this field if a prsID for this transmission point is included in the OTDOA-ProvideAssistanceData. Otherwise the field is absent. |
| ProvidedByServer2 | The target device shall include this field if multiple PRS configurations have been provided in the OTDOA-ProvideAssistanceData and not all PRS configurations have been used for estimating timing of the cell. Otherwise the field is absent. |

| OTDOA-SignalMeasurementInformation field descriptions |
| --- |
| systemFrameNumber
This field specifies the SFN of the RSTD reference cell containing the starting subframe of the PRS positioning occasion if PRS are available on the RSTD reference cell, or subframe of the CRS for RSTD measurements if PRS are not available on the RSTD reference cell during which the most recent neighbour cell RSTD measurement was performed
physCellIdRef
This field specifies the physical cell identity of the RSTD reference cell.
cellGlobalIdRef
This field specifies the ECGI, the globally unique identity of a cell in E-UTRA, of the RSTD reference cell. The target shall provide this IE if it knows the ECGI of the RSTD reference cell.
earfcnRef
This field specifies the EARFCN of the RSTD reference cell.
referenceQuality
This field specifies the target device's best estimate of the quality of the TOA measurement from the RSTD reference cell, $T_{SubframeRxRef}$, where $T_{SubframeRxRef}$ is the time of arrival of the signal from the RSTD reference cell.
neighbourMeasurementList
This list contains the measured RSTD values for neighbour cells together with the RSTD reference cell, along with quality for each measurement.
tpIdRef
This field specifies the transmission point ID of the RSTD reference cell.
prsIdRef
This field specifies the PRS-ID of the RSTD reference cell.
additionalPathsRef
This field specifies one or more additional detected path timing values for the RSTD reference cell, relative to the path timing used for determining the rstd value. If this field was requested but is not included, it means the UE did not detect any additional path timing values.
usedPrsConfigListRef
This field specifies one or more PRS configurations that have been used for timing estimation for the RSTD reference cell. If this field is excluded, it means the used all provided PRS configurations of the reference cell.
physCellIdNeighbour
This field specifies the physical cell identity of the neighbour cell for which the RSTDs are provided.
cellGlobalIdNeighbour
This field specifies the ECGI, the globally unique identity of a cell in E-UTRA, of the neighbour cell for which the RSTDs are provided. The target device shall provide this IE if it was able to determine the ECGI of the neighbour cell at the time of measurement.
earfcnNeighbour
This field specifies the EARFCN of the neighbour cell used for the RSTD measurements.
rstd
This field specifies the relative timing difference between this neighbour cell and the RSTD reference cell, as defined in [17]. Mapping of the measured quantity is defined as in [18] subclause 9.1.10.3.
rstd-Quality
This field specifies the target device's best estimate of the quality of the measured rstd.
tpIdNeighbour
This field specifies the transmission point ID for the neighbour cell for which the RSTDs are provided.
prsIdNeighbour
This field specifies the PRS-ID of the neighbour cell for which the RSTDs are provided.
delta-rstd
This field specifies the higher-resolution RSTD $\Delta_{RSTD}$ as defined in [18] subclause 9.1.10.4. Mapping of the measured quantity is defined as in [18] subclause 9.1.10.4.
additionalPathsNeighbour
This field specifies one or more additional detected path timing values for the neighbour cell, relative to the path timing used for determining the rstd value. If this field was requested but is not included, it means the UE did not detect any additional path timing values.
usedPrsConfigListNeighbour
This field specifies one or more PRS configurations that have been used for timing estimation for the RSTD neighbour cell. If this field is excluded, it means the used all provided PRS configurations of the neighbour cell. |

OTDOA-ProvideCapabilities

The IE OTDOA-ProvideCapabilities is used by the wireless device 10 to indicate its capability, see action 400, to support OTDOA and to provide its OTDOA positioning capabilities to the location node.

```
-- ASN1START
OTDOA-ProvideCapabilities ::= SEQUENCE {
        otdoa-Mode                      BIT STRING { ue-assisted (0) } (SIZE (1..8)),
        ...,
        supportedBandListEUTRA          SEQUENCE (SIZE (1..maxBands)) OF SupportedBandEUTRA
          OPTIOANL,
        supportedBandListEUTRA-v9a0     SEQUENCE (SIZE (1..maxBands1)) OF SupportedEUTRA-v9a0
          OPTIONAL,
        interFreqRSTDmeasurement-r10             ENUMERATED { supported }
          OPTIONAL,
```

```
        additionalNeighbourCellInfoList-r10          ENUMERATED { supported }
            OPTIONAL,
        prs-id-r14                                   ENUMERATED { supported }
            OPTIONAL,
        tp-separation-via-muting-r14                 ENUMERATED { supported }
            OPTIONAL,
        additional-prs-config-r14                    ENUMERATED { supported }
            OPTIONAL,
        prs-based-tbs-r14                            ENUMERATED { supported }
            OPTIONAL,
        additionalPathsReport-r14                    ENUMERATED { supported }
            OPTIONAL,
        ceDensePrsConfig-r14                         ENUMERATED { supported }
            OPTIONAL,
        supportedNoCePrsConfigs-r14                  INTEGER (1..3)
            OPTIONAL,
        supportedPrsBandwidth-r14                    ENUMERATED { n6, n15, n25, n50, n75, n100, ...}
            OPTIONAL,
        cePrsFrequencyHopping-r14                    ENUMERATED { supported }
            OPTIONAL
    }
    maxBands INTEGER ::= 64
    SupportedBandEUTRA ::= SEQUENCE {
        bandEUTRA                                    INTEGER (1..maxFBI)
    }
SupportedBandEUTRA-v9a0 ::=    SEQUENCE {
    bandEUTRA-v9a0                                   INTEGER (maxFBI-Plus1..maxFBI2)   OPTIONAL
}
maxFBI                            INTEGER ::= 64 -- Maximum value of frequency band
indicator
maxFBI-Plus1                      INTEGER ::= 65 -- lowest value extended FBI range
maxFBI2                           INTEGER ::= 256 -- highest value extended FBI range
-- ASN1STOP
```

OTDOA-ProvideCapabilities field descriptions otdoa-Mode
This field specifies the OTDOA mode(s) supported by the target device. This is represented by a bit string, with a
one-value at the bit position means the particular OTDOA mode is supported; a zero-value means not supported. A
zero-value in all bit positions in the bit string means OTDOA positioning method is not supported by the target device.
SupportedBandEUTRA
This field specifies the frequency bands for which the target device supports RSTD measurements. One entry
corresponding to each supported E-UTRA band as defined in TS 36.101 [21]. In case the target device includes
bandEUTRA-v9a0, the target device shall set the corresponding entry of bandEUTRA (i.e. without suffix) to maxFBI.
interFreqRSTDmeasurement
This field, if present, indicates that the target device supports inter-frequency RSTD measurements within and
between the frequency bands indicated in SupportedBandEUTRA.
additionalNeighbourCellInfoList
This field, if present, indicates that the target device supports up to 3 × 24 OTDOA-NeighbourCellInfoElement in
OTDOA-NeighbourCellInfoList in OTDOA-ProvideAssistanceData without any restriction for the earfcn in each
OTDOA-NeighbourCellInfoElement as specified in subclause 6.5.1.2.
prs-id
This field, if present, indicates that the target device supports PRS generation based on the PRS-ID as specified in
[16] and support for TP-ID in OTDOA-ReferenceCellInfo and OTDOA-NeighbourCellInfoList.
tp-separation-via-muting
This field, if present, indicates that the target device supports RSTD measurements for cells which have associated
transmission points (e.g., Remote Radio Heads) within the cell coverage and where these associated transmission
points have the same physical cell identity as the associated cell, and where these transmission points are identified
via a different muting pattern. The field also indicates support for TP-ID in OTDOA-ReferenceCellInfo and
OTDOA-NeighbourCellInfoList.
additional-prs-config
This field, if present, indicates that the target device supports additional PRS configurations. The additional PRS
configuration in PRS-Info IE comprise:
support for prs-ConfigurationIndex >2399;
support for $N_{PRS}$ values in addition to 1, 2, 4 and 6 (add-numDL-Frames in PRS-Info);
support for muting bit string lengths >16 bits.
prs-based-tbs
This field, if present, indicates that the target device supports RSTD measurements for PRS-only TPs.
additionalPathsReport
This field, if present, indicates that the target device supports reporting of timing information for additional detected
paths for RSTD reference and each neighbour cell.
ceDensePrsConfig
This field, if present, indicates that the target device supports more than one CE PRS occasion within a PRS
period, and an extended number of PRS subframes per CE PRS occasion
supportedNoCePrsConfigs
This field, if present, indicates that the target device supports two or more PRS configurations
supportedPrsBandwidth This field, if present, indicates the maximum PRS bandwidth supported by the target device. If not present, the target device is assumed to support the PRS bandwidth associated with the target device type.
cePrsFrequencyHopping
This field, if present, indicates that the target device supports CE PRS occasion frequency hopping.

It is e.g. herein disclosed:

Embodiment 1

A wireless device for managing positioning of the wireless device in a wireless communications network, wherein the wireless device comprises a processing circuitry and a memory, said memory containing instructions executable by said processing circuitry whereby said wireless device is operative to:
 obtain from a network node assistance data or configuration comprising two or more PRS configurations associated with a radio network node or a service area of the radio network node; and to
 indicate to the network node, a scope of usage of the two or more PRS configurations with an indication.

Embodiment 2

The wireless device according to embodiment 1, wherein the wireless device is further operative to:
 use one or more out of the two or more PRS configuration for measurements on PRSs.

Embodiment 3

The wireless device according to any of the embodiments 1-2, wherein the indication indicates that less than all PRS configurations have been used.

Embodiment 4

The wireless device according to any of the embodiments 1-3, wherein the indication defines how the PRS configurations are used at the wireless device.

Embodiment 5

The wireless device according to any of the embodiments 1-4, wherein the wireless device is further operative to
 send information about a support for using multiple PRS configurations associated to a same service area or radio network node.

Embodiment 6

The wireless device according to any of the embodiments 1-5, wherein the PRS configurations of the two or more PRS configurations are characterized by different bandwidths, different number of subframes, different number of additional PRS occasions, and/or frequency hopping or not.

Embodiment 7

The wireless device according to any of the embodiments 1-6, wherein the indication is an index or a real value.

Embodiment 8

A network node for handling positioning of a wireless device in a wireless communications network, wherein the network node comprises a processing circuitry and a memory, said memory containing instructions executable by said processing circuitry whereby said network node is operative to:
 transmit, to the wireless device, assistance data comprising two of more PRS configurations associated with a radio network node or with a service area of the radio network node;
 receive from the wireless device, an indication indicating a scope of usage of the two of more PRS configurations; and to
 use the indication in a positioning related process.

Embodiment 9

The network node according to embodiment 8, wherein the positioning related process is a process for positioning the wireless device and wherein the network node is operative to estimate a position of the wireless device based on the received indication.

Embodiment 10

The network node according to any of the embodiments 8-9, wherein the positioning related process is a process for deciding whether to configure multiple PRS configurations in one or more regions.

Embodiment 11

The network node according to any of the embodiments 8-10, wherein the positioning related process is a process for determining statistics of multiple PRS configurations.

Embodiment 12

The network node according to any of the embodiments 8-11, wherein the network node is operative to receive, from the wireless device, information about a support for using multiple PRS configurations associated to a same service area or radio network node; and wherein the network node is operative to use the received information in the positioning related process.

Embodiment 13

A wireless device for managing positioning of the wireless device in a wireless communications network, wherein the wireless device comprises:
 an obtaining unit configured to obtain from a network node assistance data or configuration comprising two or more PRS configurations associated with a radio network node or a service area of the radio network node; and
 a transmitting unit configured to indicate to the network node, a scope of usage of the two or more PRS configurations with an indication.

Embodiment 14

The wireless device according to embodiment 13, wherein the wireless device further comprises a measuring unit configured to use one or more out of the two or more PRS configuration for measurements on PRSs.

Embodiment 15

The wireless device according to any of the embodiments 13-14, wherein the indication indicates that less than all PRS configurations have been used.

Embodiment 16

The wireless device according to any of the embodiments 13-15, wherein the indication defines how the PRS configurations are used at the wireless device.

Embodiment 17

The wireless device according to any of the embodiments 13-16, wherein the wireless device further comprises
an indicating unit configured to send information about a support for using multiple PRS configurations associated to a same service area or radio network node.

Embodiment 18

The wireless device according to any of the embodiments 13-17, wherein the PRS configurations of the two or more PRS configurations are characterized by different bandwidths, different number of subframes, different number of additional PRS occasions, and/or frequency hopping or not.

Embodiment 19

The wireless device according to any of the embodiments 13-18, wherein the indication is an index or a real value.

Embodiment 20

A network node for handling positioning of a wireless device in a wireless communications network, wherein the network node comprises:
a transmitting unit configured to transmit, to the wireless device, assistance data comprising two of more PRS configurations associated with a radio network node or with a service area of the radio network node;
an obtaining unit configured to receive from the wireless device, an indication indicating a scope of usage of the two of more PRS configurations; and
a using unit configured to use the indication in a positioning related process.

Embodiment 21

The network node according to embodiment 20, wherein the positioning related process is a process for positioning the wireless device and wherein the using unit is configured to estimate a position of the wireless device based on the received indication.

Embodiment 22

The network node according to any of the embodiments 20-21, wherein the positioning related process is a process for deciding whether to configure multiple PRS configurations in one or more regions.

Embodiment 23

The network node according to any of the embodiments 20-22, wherein the positioning related process is a process for determining statistics of multiple PRS configurations.

Embodiment 24

The wireless device according to any of the embodiments 20-23, wherein the obtaining unit is configured to receive, from the wireless device, information about a support for using multiple PRS configurations associated to a same service area or radio network node; and wherein the using unit is configured to use the received information in the positioning related process.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling positioning of a wireless device in a wireless communications network, the method comprising:
transmitting, to the wireless device, assistance data comprising two or more positioning reference signal, PRS, configurations associated with a radio network node or with a service area of the radio network node;
receiving, from the wireless device, an indication indicating a scope of usage of the two or more PRS configurations at the wireless device, wherein the indication indicates that less than all PRS configurations have been used at the wireless device and/or how the PRS configurations are used at the wireless device; and
using the indication in a positioning related process, the positioning related process comprising:
compiling, based on the indication, statistics per region; and
using the statistics from one region to decide whether to configure multiple PRS configurations in another region, or to decide to disable multiple PRS configurations based on at least one cost of transmitting multiple PRS configurations.

2. The method according to claim 1, wherein the positioning related process is a process for positioning the wireless device and wherein the network node estimates a position of the wireless device based on the received indication.

3. The method according to claim 1, further comprising:
receiving, from the wireless device, information about a support for using multiple PRS configurations associated to a same service area or radio network node; and
wherein the received information is used in the positioning related process.

4. A network node for handling positioning of a wireless device in a wireless communications network, wherein the network node is configured to:
transmit, to the wireless device, assistance data comprising two or more positioning reference signal, PRS, configurations associated with a radio network node or with a service area of the radio network node;
receive from the wireless device, an indication indicating a scope of usage of the two or more PRS configurations at the wireless device, wherein the indication indicates that less than all PRS configurations have been used at the wireless device and/or how the PRS configurations are used at the wireless device; and use the indication in a positioning related process, the positioning related process comprising:

compiling, based on the indication, statistics per region; and using the statistics from one region to decide whether to configure multiple PRS configurations in another region, or to decide to disable multiple PRS configurations based on at least one cost of transmitting multiple PRS configurations.

5. The network node according to claim 4, wherein the positioning related process is a process for positioning the wireless device and wherein the network node is configured to estimate a position of the wireless device based on the received indication.

* * * * *